United States Patent
Birnbaum et al.

(10) Patent No.: US 10,248,203 B2
(45) Date of Patent: *Apr. 2, 2019

(54) SYSTEMS AND METHODS FOR PHYSICS-BASED TACTILE MESSAGING

(75) Inventors: David M. Birnbaum, Oakland, CA (US); Chris Ullrich, Ventura, CA (US); Danny Grant, Laval (CA)

(73) Assignee: IMMERSION CORPORATION, San Jose, CA (US)

(*) Notice: Subject to any disclaimer, the term of this patent is extended or adjusted under 35 U.S.C. 154(b) by 899 days.

This patent is subject to a terminal disclaimer.

(21) Appl. No.: 12/502,755

(22) Filed: Jul. 14, 2009

(65) Prior Publication Data

US 2010/0017759 A1  Jan. 21, 2010

Related U.S. Application Data

(60) Provisional application No. 61/080,978, filed on Jul. 15, 2008, provisional application No. 61/080,981, (Continued)

(51) Int. Cl.
*G06F 3/048* (2013.01)
*G06F 3/01* (2006.01)
(Continued)

(52) U.S. Cl.
CPC ............ *G06F 3/016* (2013.01); *G06F 1/1613* (2013.01); *G06F 3/017* (2013.01); *G06F 3/0346* (2013.01);
(Continued)

(58) Field of Classification Search
CPC ....................................... G06F 3/0481–3/0489
(Continued)

(56) References Cited

U.S. PATENT DOCUMENTS

| 4,873,623 A | 10/1989 | Lane et al. |
| 5,666,499 A | 9/1997 | Baudel et al. |

(Continued)

FOREIGN PATENT DOCUMENTS

| CN | 1585922 A | 2/2005 |
| CN | 101118469 A | 2/2008 |

(Continued)

OTHER PUBLICATIONS

Biet, M. et al., Discrimination of Virtual Square Gratings by Dynamic Touch on Friction Based Tactile Displays, Haptic Interfaces for Virtual Environment and Teleoperator Systems, 2008, Symposium, IEEE, Piscataway, NJ, XP 031339918, pp. 41-48, Mar. 2008.

(Continued)

*Primary Examiner* — Steven B Theriault
(74) *Attorney, Agent, or Firm* — Kilpatrick Townsend & Stockton LLP

(57) ABSTRACT

Systems and methods for physics-based tactile messaging are disclosed. For example, one disclosed method includes the steps of receiving a sensor signal from a sensor configured to sense a physical interaction with a messaging device; determining an interaction between one or more virtual message objects and a virtual message environment, the interaction based at least in part on the sensor signal and a virtual physical parameter of at least one of the one or more virtual message objects; and determining a haptic effect based at least in part on the interaction. The method additionally includes the step of generating a haptic signal configured to cause an actuator to output the haptic effect.

2 Claims, 8 Drawing Sheets

Related U.S. Application Data filed on Jul. 15, 2008, provisional application No. 61/080,985, filed on Jul. 15, 2008, provisional application No. 61/080,987, filed on Jul. 15, 2008, provisional application No. 61/148,312, filed on Jan. 29, 2009, provisional application No. 61/181,280, filed on May 26, 2009.

(51) Int. Cl.

| | | |
|---|---|---|
| *H04M 1/725* | (2006.01) | |
| *H04W 4/21* | (2018.01) | |
| *G06F 1/16* | (2006.01) | |
| *G06F 3/0346* | (2013.01) | |
| *H04M 19/04* | (2006.01) | |
| *G08B 6/00* | (2006.01) | |
| *G06F 3/041* | (2006.01) | |
| *G06F 3/0484* | (2013.01) | |
| *G06F 3/0488* | (2013.01) | |
| *G06F 3/16* | (2006.01) | |

(52) U.S. Cl.
CPC ............ *G06F 3/041* (2013.01); *G06F 3/0488* (2013.01); *G06F 3/04842* (2013.01); *G06F 3/04845* (2013.01); *G06F 3/04883* (2013.01); *G06F 3/04886* (2013.01); *G06F 3/167* (2013.01); *G08B 6/00* (2013.01); *H04M 1/72544* (2013.01); *H04M 1/72547* (2013.01); *H04M 1/72572* (2013.01); *H04M 19/047* (2013.01); *H04W 4/21* (2018.02); *G06F 2200/1637* (2013.01); *G06F 2203/014* (2013.01); *G06F 2203/04101* (2013.01); *G06F 2203/04104* (2013.01); *G06F 2203/04106* (2013.01); *G06F 2203/04808* (2013.01); *H04M 2250/12* (2013.01)

(58) Field of Classification Search
USPC .................................................. 715/701, 702
See application file for complete search history.

(56) References Cited

U.S. PATENT DOCUMENTS

| | | | |
|---|---|---|---|
| 5,844,547 A | 12/1998 | Minakuchi et al. | |
| 6,434,604 B1 * | 8/2002 | Harada et al. | 709/207 |
| 6,573,883 B1 | 6/2003 | Bartlett | |
| 6,639,582 B1 | 10/2003 | Shrader | |
| 6,803,924 B1 | 10/2004 | Snibbe et al. | |
| 6,903,723 B1 | 6/2005 | Forest | |
| 6,963,762 B2 * | 11/2005 | Kaaresoja et al. | 455/567 |
| 7,081,882 B2 | 7/2006 | Sowden et al. | |
| 7,176,866 B2 | 2/2007 | Teraishi et al. | |
| 7,176,886 B2 | 2/2007 | Marvit et al. | |
| 7,191,191 B2 | 3/2007 | Peurach et al. | |
| 7,450,110 B2 | 11/2008 | Shahoian et al. | |
| 7,468,573 B2 | 12/2008 | Dai et al. | |
| 7,548,232 B2 | 6/2009 | Shahoian et al. | |
| 7,721,968 B2 | 5/2010 | Wigdor | |
| 7,788,032 B2 | 8/2010 | Moloney | |
| 7,810,247 B2 | 10/2010 | Fourquin et al. | |
| 8,000,724 B1 | 8/2011 | Rayburn et al. | |
| 8,123,614 B2 | 2/2012 | Kulas | |
| 8,201,108 B2 * | 6/2012 | Chen et al. | 715/863 |
| 8,239,769 B2 * | 8/2012 | Ruiz-Velasco et al. | 715/738 |
| 8,266,551 B2 * | 9/2012 | Boldyrev et al. | 715/863 |
| 8,271,902 B1 * | 9/2012 | Mangini et al. | 715/834 |
| 8,306,576 B2 | 11/2012 | Cho et al. | |
| 8,315,652 B2 | 11/2012 | Grant et al. | |
| 8,316,166 B2 * | 11/2012 | Grant et al. | 710/73 |
| 8,412,282 B2 | 4/2013 | Yoon et al. | |
| 8,516,396 B2 * | 8/2013 | Bromenshenkel et al. | 715/848 |
| 8,532,637 B2 | 9/2013 | Abolrous et al. | |
| 8,587,601 B1 * | 11/2013 | Kahn et al. | 345/582 |
| 8,595,649 B2 * | 11/2013 | Sherrard et al. | 715/834 |
| 8,803,795 B2 | 8/2014 | Grant et al. | |
| 8,933,891 B2 * | 1/2015 | Kim et al. | 345/173 |
| 8,984,444 B2 * | 3/2015 | O | 715/837 |
| 9,063,571 B2 | 6/2015 | Birnbaum et al. | |
| 9,612,662 B2 | 4/2017 | Birnbaum et al. | |
| 9,645,647 B2 | 5/2017 | Levesque | |
| 2001/0010513 A1 | 8/2001 | Rosenberg et al. | |
| 2001/0035854 A1 | 11/2001 | Rosenberg et al. | |
| 2001/0045941 A1 | 11/2001 | Rosenberg et al. | |
| 2001/0050693 A1 | 12/2001 | Nishiyama et al. | |
| 2002/0140625 A1 | 10/2002 | Kidney et al. | |
| 2002/0154168 A1 * | 10/2002 | Ijas et al. | 345/764 |
| 2002/0177471 A1 | 11/2002 | Kaaresoja et al. | |
| 2003/0063067 A1 | 4/2003 | Chuang | |
| 2003/0063128 A1 | 4/2003 | Salmimaa et al. | |
| 2003/0100969 A1 * | 5/2003 | Jones | 700/97 |
| 2003/0128237 A1 * | 7/2003 | Sakai | 345/748 |
| 2003/0162595 A1 | 8/2003 | Serbanescu | |
| 2004/0008191 A1 | 1/2004 | Poupyrev et al. | |
| 2004/0058718 A1 | 3/2004 | Yu et al. | |
| 2004/0067780 A1 | 4/2004 | Eiden et al. | |
| 2004/0075691 A1 * | 4/2004 | Moon | 345/805 |
| 2005/0052430 A1 | 3/2005 | Shahoian et al. | |
| 2005/0058268 A1 | 3/2005 | Koch et al. | |
| 2005/0093868 A1 | 5/2005 | Hinckley | |
| 2005/0103863 A1 | 5/2005 | Zhu et al. | |
| 2005/0108660 A1 * | 5/2005 | Cheng et al. | 715/863 |
| 2005/0114142 A1 | 5/2005 | Asukai et al. | |
| 2005/0124412 A1 | 6/2005 | Son et al. | |
| 2005/0134561 A1 | 6/2005 | Tierling et al. | |
| 2005/0179617 A1 | 8/2005 | Matsui et al. | |
| 2005/0184696 A1 * | 8/2005 | Anastas et al. | 318/567 |
| 2005/0210410 A1 | 9/2005 | Ohwa et al. | |
| 2005/0216568 A1 * | 9/2005 | Walkush et al. | 709/207 |
| 2005/0216867 A1 | 9/2005 | Marvit et al. | |
| 2005/0219211 A1 * | 10/2005 | Kotzin et al. | 345/158 |
| 2005/0219223 A1 * | 10/2005 | Kotzin et al. | 345/173 |
| 2006/0028453 A1 | 2/2006 | Kawabe | |
| 2006/0061545 A1 | 3/2006 | Hughes et al. | |
| 2006/0109102 A1 | 5/2006 | Gortz et al. | |
| 2006/0146765 A1 | 7/2006 | Van De et al. | |
| 2006/0181510 A1 | 8/2006 | Faith | |
| 2006/0197753 A1 | 9/2006 | Hotelling | |
| 2006/0241864 A1 | 10/2006 | Rosenberg et al. | |
| 2006/0255683 A1 * | 11/2006 | Suzuki et al. | 310/317 |
| 2006/0256074 A1 | 11/2006 | Krum et al. | |
| 2006/0258378 A1 * | 11/2006 | Kaikuranata | 455/466 |
| 2006/0279476 A1 | 12/2006 | Obata | |
| 2006/0279542 A1 | 12/2006 | Flack et al. | |
| 2006/0284849 A1 * | 12/2006 | Grant et al. | 345/173 |
| 2007/0040810 A1 | 2/2007 | Dowe et al. | |
| 2007/0049301 A1 | 3/2007 | Mock et al. | |
| 2007/0057913 A1 | 3/2007 | Eid et al. | |
| 2007/0066283 A1 | 3/2007 | Haar et al. | |
| 2007/0124503 A1 | 5/2007 | Ramos et al. | |
| 2007/0139366 A1 | 6/2007 | Dunko et al. | |
| 2007/0146347 A1 | 6/2007 | Rosenberg et al. | |
| 2007/0152984 A1 | 7/2007 | Ording et al. | |
| 2007/0157089 A1 | 7/2007 | Van et al. | |
| 2007/0168118 A1 | 7/2007 | Lappe et al. | |
| 2007/0171046 A1 | 7/2007 | Diem et al. | |
| 2007/0242056 A1 | 10/2007 | Engelhardt et al. | |
| 2007/0247442 A1 | 10/2007 | Andre et al. | |
| 2008/0020843 A1 | 1/2008 | Wolinsky | |
| 2008/0055269 A1 | 3/2008 | Lemay et al. | |
| 2008/0133336 A1 | 6/2008 | Altman et al. | |
| 2008/0143685 A1 | 6/2008 | Lee et al. | |
| 2008/0153520 A1 | 6/2008 | Kirtane | |
| 2008/0153554 A1 | 6/2008 | Yoon et al. | |
| 2008/0168403 A1 | 7/2008 | Westerman et al. | |
| 2008/0244681 A1 | 10/2008 | Gossweiler et al. | |
| 2008/0287147 A1 * | 11/2008 | Grant et al. | 455/466 |
| 2008/0300055 A1 | 12/2008 | Lutnick et al. | |
| 2008/0307322 A1 * | 12/2008 | Stochosky et al. | 715/752 |
| 2009/0073118 A1 | 3/2009 | Yamaji et al. | |
| 2009/0098888 A1 | 4/2009 | Yoon et al. | |
| 2009/0100384 A1 | 4/2009 | Louch | |

(56) References Cited

U.S. PATENT DOCUMENTS

| | | | |
|---|---|---|---|
| 2009/0140986 | A1 | 6/2009 | Karkkainen et al. |
| 2009/0167509 | A1* | 7/2009 | Fadell et al. ............... 340/407.2 |
| 2009/0167701 | A1 | 7/2009 | Ronkainen |
| 2009/0295743 | A1 | 12/2009 | Nakajoh |
| 2009/0309825 | A1 | 12/2009 | Sodergren et al. |
| 2010/0004008 | A1 | 1/2010 | Abolrous et al. |
| 2010/0013777 | A1 | 1/2010 | Baudisch et al. |

FOREIGN PATENT DOCUMENTS

| | | |
|---|---|---|
| EP | 0 899 650 | 3/1999 |
| EP | 1 401 185 | 3/2004 |
| EP | 1 731 993 | 12/2006 |
| EP | 1726142 A2 | 12/2006 |
| EP | 2327201 B1 | 9/2018 |
| EP | 3130983 | 11/2018 |
| FR | 2910160 | 6/2008 |
| GB | 2 416 962 | 2/2006 |
| JP | H04249835 A | 9/1992 |
| JP | 05-100809 | 4/1993 |
| JP | H06242886 A | 9/1994 |
| JP | H10341253 A | 12/1998 |
| JP | H1115600 A | 1/1999 |
| JP | H1133229 A | 2/1999 |
| JP | 3085481 | 5/2002 |
| JP | 2003085590 | 3/2003 |
| JP | 2003-188945 A | 7/2003 |
| JP | 2003-188946 A | 7/2003 |
| JP | 2004-503004 A | 1/2004 |
| JP | 2004057654 | 2/2004 |
| JP | 2004-164242 A | 6/2004 |
| JP | 2004-177992 A | 6/2004 |
| JP | 2004-521424 A | 7/2004 |
| JP | 2004-242728 A | 9/2004 |
| JP | 2005-020563 A | 1/2005 |
| JP | 2005-505847 A | 2/2005 |
| JP | 2005-152054 | 6/2005 |
| JP | 2006040005 | 2/2006 |
| JP | 2006-511134 A | 3/2006 |
| JP | 2006-163579 A | 6/2006 |
| JP | 2006-518507 A | 8/2006 |
| JP | 2006201912 | 8/2006 |
| JP | 2007-188126 A | 7/2007 |
| JP | 2007-301270 A | 11/2007 |
| JP | 2007-531113 | 11/2007 |
| JP | 2007-531153 A | 11/2007 |
| JP | 2007-531158 | 11/2007 |
| JP | 2007-535273 | 11/2007 |
| JP | 2008-546360 A | 12/2008 |
| JP | 2009-217805 A | 9/2009 |
| JP | 6433556 | 12/2018 |
| JP | 6449934 | 1/2019 |
| KR | 1020010108361 A | 12/2001 |
| KR | 1020050104382 A | 11/2005 |
| KR | 1020060106010 A | 10/2006 |
| KR | 20070007808 A | 1/2007 |
| KR | 1020070028308 A | 3/2007 |
| KR | 100775190 B1 | 11/2007 |
| KR | 20080058124 A | 6/2008 |
| WO | 2002/03172 A3 | 1/2002 |
| WO | WO 2002/057885 A2 | 7/2002 |
| WO | 2003/034196 A1 | 4/2003 |
| WO | 2003/042805 A1 | 5/2003 |
| WO | WO 2004/044728 A2 | 5/2004 |
| WO | WO 2004/075169 A2 | 9/2004 |
| WO | 2005/103860 A1 | 11/2005 |
| WO | 2005/112287 A1 | 11/2005 |
| WO | WO 2005/103863 | 11/2005 |
| WO | WO 2006/013363 A1 | 2/2006 |
| WO | WO 2006/094308 | 9/2006 |
| WO | WO 2008/132540 A1 | 11/2008 |
| WO | WO 2009/074185 A1 | 6/2009 |
| WO | 2010/009163 A1 | 1/2010 |

OTHER PUBLICATIONS

Rovers, A. et al., HIM: A Framework for Haptic Instant Messaging, CHI 2004 (CHI Conference Proceedings. Human Factors in Computing Systems), XP 002464573, Vienna Austria, Apr. 2004, p. 1313-1316.
Patent Cooperation Treaty, International Search Report, International Application No. PCT/US2009/050587, dated Oct. 29, 2009.
Patent Cooperation Treaty, International Search Report, International Application No. PCT/US2009/050574, dated Oct. 29, 2009.
Patent Cooperation Treaty, International Search Report, International Application No. PCT/US2009/050564, dated Oct. 28, 2009.
Patent Cooperation Treaty, Invitation to Pay Additional Fees, Application No. PCT/US2009/050569, dated Nov. 9, 2009.
International Search Report and Written Opinion dated Feb. 11, 2010 for corresponding International Application No. PCT/US2009/050569.
Williamson, J. et al., Shoogle: Excitatory Multimodal Interaction on Mobile Devices, CHI 2007 Proceedings-Shake, Rattle and Roll: New Forms of Input and Output, 2007, pp. 121-124, XP002549378.
Patent Cooperation Treaty, International Search Report, International Application No. PCT/US2009/050579, dated Oct. 21, 2009.
International Preliminary Report on Patentability dated Jan. 27, 2011 for corresponding International Application No. PCT/US2009/050579.
International Search Report dated Mar. 23, 2010 for International Application No. PCT/US2010/022528.
Chinese Office Action dated Nov. 13, 2012 for corresponding Chinese Patent Application No. 200980127978.1.
Office Action dated Feb. 27, 2013 for corresponding U.S. Appl. No. 12/697,030.
Chinese Office Action dated Dec. 6, 2012 for corresponding Chinese Patent Application No. 200980127939.1.
Chinese Office Action dated Jan. 31, 2013 for corresponding Chinese Patent Application No. 200980182008.3.
Office Action dated Feb. 28, 2013 for corresponding U.S. Appl. No. 12/502,795.
United States Patent and Trademark Office, Office Action, U.S. Appl. No. 12/697,030, dated Jun. 3, 2013.
Notice of Reasons for Rejection, Japanese Application No. 2011-518849, dated May 28, 2013.
Office Action dated Sep. 26, 2012 for corresponding U.S. Appl. No. 12/697,030.
Office Action dated Sep. 11, 2012 for corresponding U.S. Appl. No. 12/502,758.
De Witt, A, "Designing Sonification of User Data in Affective Interaction," Master of Science Thesis, Stockholm, Sweden, 2007, XP 002551466, retrieved from the Internet: URL: http://w3.nada.kth.se/utbildning/grukth/exjobb/rapportlistor/2007/rapporter07/de_witt_anna_07142.pdf>[retrieved on Oct. 20, 2009].
Kaaresoja, T., et al., "Snap-Crackle-Pop: Tactile Feedback for Mobile Touch Screens," Internet Article, [Online] Jul. 2006, XP002551465 Proceedings of the Eurohaptics 2006, retrieved from the Internet: URL:http://isc.univ-evry.fr/~eurohaptics/u pload/cd/papers/f80.pdf>[retrieved on Oct. 20, 2009].
Oakley, I., et al., "Contact IM: Exploring Asynchronous Touch Over Distance," Nov. 16, 2002, XP007910188, Retrieved from the Internet: URL: http://people.cs.vt.edu/~wangr06/touch%20review%20origanization/OakO02.pdf>.
Sekiguchi, Y. et al., "Haptic Interface Using "Estimation of Box Contents" Metaphor," Dec. 3, 2003, XP002551467 Proceedings of ICAT Dec. 3-5, 2003, Tokyo, Japan, Retrieved from the Internet: URL://http//www.vrsj.orcr/ic-at/papers/2003/00947_00000.pdf. [retrieved on Oct. 20, 2009].
Office Action dated Nov. 13, 2012 for corresponding U.S. Appl. No. 12/502,702.
International Preliminary Report on Patentability dated Aug. 11, 2011 for corresponding International Patent Application PCT/US2010/022528.
International Preliminary Report on Patentability dated Jan. 27, 2011 for corresponding International Patent Application PCT/US2009/050569.

(56) References Cited

OTHER PUBLICATIONS

International Preliminary Report on Patentability dated Jan. 27, 2011 for corresponding International Patent Application PCT/US2009/050564.
International Preliminary Report on Patentability dated Jan. 27, 2011 for corresponding International Patent Application PCT/US2009/050574.
International Preliminary Report on Patentability dated Jan. 27, 2011 for corresponding International Patent Application PCT/US2009/050587.
Chinese Office Action dated Nov. 29, 2012 for corresponding Chinese Patent Application No. 200980127938.7.
Brown, L.M. and Williamson, J., "Shake2Talk: Multimodal Messaging for Interpersonal Communication," Oakley, I. and Brewster, S. (eds), HAID 2007, LNCS 4813, pp. 44-55.
Smith, J. et al., "Communicating emotion through a haptic link: Design space and methodology," Int. J. Human-Computer Studes, 2007, 65:376-387.
Snibbe, S.S. et al., "Haptic Techniques for Media Control," Proceedings of 14th Annual ACM Symposium on User Interface Software and Technology, Orlando, Florida, Nov. 2001.
Verplank, B. et al., "THE PLANK: Designing a simple haptic controller." Proceedings of the Conference on New Instruments for Musical Expression, Dublin, Ireland, May 24-26, 2012.
United States Patent and Trademark Office, Office Action, U.S. Appl. No. 11/927,060, dated Jun. 4, 2012.
Office Action dated Aug. 17, 2012 for corresponding U.S. Appl. No. 12/502,795.
The State Intellectual Property Office of the People's Republic of China, Notification of the Second Office Action, Application No. 200980127939, dated Jul. 18, 2013.
United States Patent and Trademark Office, Office Action, U.S. Appl. No. 13/832,420 dated Jul. 3, 2013.
United States Patent and Trademark Office, Office Action, U.S. Appl. No. 12/502,795 dated Sep. 30, 2013.
Office Action dated Oct. 14, 2013 for corresponding European Patent Application 09790406.4.
Office Action dated Oct. 14, 2013 for corresponding European Patent Application 09790403.1.
Office Action dated Oct. 14, 2013 for corresponding European Patent Application 09790404.9.
Anonymous: "CSCW 2002—Interactive Posters", Jun. 26, 2002, pp. 1-11, XP55082201, Retrieved from the Internet: URL:http://www.acm_org/conferences/cscw2002/cfp-posters.html (retrieved on Oct. 2, 2013).
Office Action dated Oct. 14, 2013 for corresponding European Patent Application 09790414.8.
Notice of Reasons for Rejection dated Aug. 20, 2013 for corresponding Japanese Patent Application 2011-518852.
Office Action dated Oct. 22, 2013 for corresponding European Patent Application 2011-518856.
Office Action dated Oct. 17, 2013 for corresponding European Patent Application 200980127923.0.
European Patent Office, Communication Pursuant to Article 94(3) EPC, Application No. 09790404, dated Aug. 4, 2014.
European Patent Office, Communication Pursuant to Article 94(3) EPC, Application No. 0979014, dated Aug. 4, 2014.
European Patent Office, Communication Pursuant to Article 94(3) EPC, Application No. 09790406, dated Jul. 30, 2014.
European Patent Office, Communication Pursuant to Article 94(3) EPC, Application No. 09790403, dated Jul. 30, 2014.
Japanese Patent Office, Decision of Rejection, Application No. 2011-518852, dated Jul. 15, 2014.
Korean Patent Office, Notice of Preliminary Rejection, Application No. 10-2014-7002738, dated Jul. 15, 2014.
Japanese Patent Office, Notice of Reasons for Rejection, Application No. 2014-164916 dated Sep. 29, 2015.
United States Patent and Trademark Office, Office Action, U.S. Appl. No. 14/612,392 dated Oct. 5, 2015.
Japanese Patent Office, Notice of Reasons for Rejection, Application No. JP 2011-518849 dated Dec. 16, 2015.
Chinese Office Action, Re-examination Notification, Chinese Application No. 200980127938 dated Jan. 9, 2016.
United States Patent and Trademark Office, Office Action, U.S. Appl. No. 14/712,358 dated Dec. 30, 2015.
United States Patent and Trademark Office, Office Action, U.S. Appl. No. 12/502,795 dated Jan. 27, 2016.
European Patent Office, Communication Pursuant to Article 94(3) EPC, Application No. 09790410 dated Feb. 4, 2016.
Patent Reexamination Board of the Chinese Patent Office, Notification of Reexamination, Application No. 200980127939 dated Feb. 15, 2016.
EP 17158253.9, "Office Action", dated Aug. 8, 2018, 7 pages.
EP 17159429.4, "Office Action", dated Aug. 28, 2018, 7 pages.
KR 10-2018-7006662, "Office Action", dated Sep. 18, 2018, 5 pages.
U.S. Appl. No. 12/502,647, "Final Office Action", dated Apr. 24, 2013, 11 pages.
U.S. Appl. No. 12/502,647, "Non-Final Office Action", dated Nov. 15, 2012, 14 pages.
U.S. Appl. No. 12/502,647, "Non-Final Office Action", dated Dec. 12, 2011, 17 pages.
U.S. Appl. No. 12/502,702, "Non-Final Office Action", dated May 6, 2013, 10 pages.
U.S. Appl. No. 12/502,702, "Non-Final Office Action", dated Jun. 15, 2012, 14 pages.
U.S. Appl. No. 12/502,755, "Examiner's Answer", U.S. Patent Office Application No., dated Sep. 27, 2016, 15 pages.
U.S. Appl. No. 12/502,755, "Non-Final Office Action", dated Oct. 23, 2013, 21 pages.
U.S. Appl. No. 12/502,795, "Examiner's Answer", dated Apr. 14, 2017, 14 pages.
U.S. Appl. No. 12/502,795, "Final Office Action", dated Mar. 6, 2012, 11 pages.
U.S. Appl. No. 12/502,795, "Final Office Action", dated Jun. 7, 2016, 13 pages.
U.S. Appl. No. 12/502,795, "Final Office Action", dated Jan. 5, 2015, 14 pages.
U.S. Appl. No. 12/502,795, "Non-Final Office Action", dated Jul. 30, 2014, 13 pages.
U.S. Appl. No. 12/502,795, "Non-Final Office Action", dated Oct. 5, 2011, 9 pages.
U.S. Appl. No. 12/697,030, "Final Office Action", dated Apr. 21, 2017, 22 pages.
U.S. Appl. No. 12/697,030, "Non-Final Office Action", dated Oct. 31, 2016, 20 pages.
U.S. Appl. No. 13/832,420, "Final Office Action", dated Dec. 31, 2013, 10 pages.
U.S. Appl. No. 13/832,420, "Non-Final Office Action", dated Aug. 22, 2014, 19 pages.
U.S. Appl. No. 14/106,929, "Non-Final Office Action", dated Jul. 15, 2014, 5 pages.
U.S. Appl. No. 14/198,884, "Final Office Action", dated Jun. 15, 2017, 11 pages.
U.S. Appl. No. 14/198,884, "Final Office Action", dated Mar. 8, 2018, 11 pages.
U.S. Appl. No. 14/198,884, "Non-Final Office Action", dated Sep. 29, 2017, 11 pages.
U.S. Appl. No. 14/198,884, "Non-Final Office Action", dated Dec. 19, 2016, 9 pages.
U.S. Appl. No. 14/491,137, "Non-Final Office Action", dated Dec. 15, 2014, 6 pages.
U.S. Appl. No. 14/612,392, "Final Office Action", dated Mar. 8, 2017, 17 pages.
U.S. Appl. No. 14/612,392, "Final Office Action", dated Mar. 30, 2016, 9 pages.
U.S. Appl. No. 14/612,392, "Non-Final Office Action", dated Aug. 24, 2016, 14 pages.
U.S. Appl. No. 14/712,358, "Final Office Action", dated Aug. 9, 2016, 11 pages.
U.S. Appl. No. 15/443,482, "Non-Final Office Action", dated Mar. 8, 2018, 22 pages.

(56) References Cited

OTHER PUBLICATIONS

CN 200980127923.0, "Office Action", dated Jun. 20, 2014, 11 pages.
CN 200980127923.0, "Office Action", dated Dec. 5, 2012, 17 pages.
CN 200980127938.7, "Office Action", dated Jul. 20, 2016, 16 pages.
CN 200980127938.7, "Office Action", dated May 16, 2014, 10 pages.
CN 200980127938.7, "Office Action", dated Nov. 4, 2014, 11 pages.
CN 200980127938.7, "Office Action", dated Aug. 10, 2015, 8 pages.
CN 200980127938.7, "Office Action", dated Sep. 17, 2013, 9 pages.
CN 200980127939.1, "Office Action", dated Aug. 12, 2015, 12 pages.
CN 200980127939.1, "Office Action", dated May 6, 2014, 13 pages.
CN 200980127939.1, "Office Action", dated Nov. 12, 2013, 7 Pages.
CN 200980127978.1, "Office Action", dated Sep. 30, 2013, 9 pages.
CN 200980128008.3, "Office Action", dated Jan. 31, 2013, 13 pages.
CN 200980128008.3, "Office Action", dated Sep. 30, 2013, 5 Pages.
CN 201410153123.9, "Office Action", dated Oct. 31, 2016, 5 pages.
CN 201510019130.4, "Office Action", dated May 9, 2018, 14 pages.
CN 201510019130.4, "Office Action", dated Jul. 24, 2017, 7 pages.
EP 09790403.1, "Office Action", dated May 4, 2015, 5 pages.
EP 09790404.9, "Office Action", dated May 31, 2016, 11 pages.
EP 09790404.9, "Office Action", dated Feb. 7, 2017, 6 pages.
EP 09790406.4, "Office Action", dated May 4, 2015, 5 pages.
EP 09790406.4, "Summons to Oral Proceedings", dated Dec. 3, 2015.
EP 09790414.8, "Decision to Refuse a European Patent", dated Dec. 13, 2016, 28 pages.
EP 09790414.8, "Summons to Attend Oral Proceedings", dated Jun. 9, 2016, 101 pages.
EP 14151307.7, "Office Action", dated Aug. 10, 2017, 8 pages.
EP 14151307.7, "Office Action", dated Mar. 9, 2018, 9 pages.
EP 14151328.3, "Office Action", dated Jul. 19, 2017, 8 pages.
EP 14151328.3, "Office Action", dated Mar. 9, 2018, 8 pages.
EP 16187932.5, "Office Action", dated Sep. 6, 2017, 9 pages.
EP 17155928.9, "Extended European Search Report", dated Jul. 17, 2017, 14 pages.
JP 2011-518849, "Office Action", dated Apr. 22, 2015, 3 pages.
JP 2011-518849, "Office Action", dated Dec. 10, 2013, 3 pages.
JP 2011-518856, "Office Action", dated Oct. 21, 2014, 2 Pages.
JP 2014-029131, "Office Action", dated Jun. 30, 2015, 5 pages.
JP 2014-087038, "Office Action", dated Jan. 17, 2017, 3 pages.
JP 2014-087038, "Office Action", dated Jul. 5, 2016, 3 pages.
JP 2014-087038, "Office Action", dated Jul. 7, 2015, 4 pages.
JP 2014-164916, "Office Action", dated Apr. 5, 2016, 3 pages.
JP 2015-116232, "Office Action", dated May 17, 2016, 12 pages.
JP 2016-039643, "Office Action", dated Nov. 29, 2016, 4 pages.
JP 2016-154485, "Office Action", dated Jun. 6, 2017, 5 pages.
JP 2017-097611, "Office Action", dated Mar. 27, 2018, 4 pages.
JP 2017-171705, "Office Action", dated Jun. 26, 2018, 3 pages.
KR 10-2011-7003437, "Office Action", dated Apr. 29, 2016, 3 pages.
KR 10-2011-7003437, "Office Action", dated Sep. 5, 2016, 5 pages.
KR 10-2011-7003437, "Office Action", dated Jul. 28, 2015, 6 pages.
KR 10-2011-7003489, "Office Action", dated Oct. 31, 2013, 3 pages.
KR 10-2011-7003491, "Office Action", dated Jul. 28, 2015, 12 pages.
KR 10-2011-7003491, "Office Action", dated Aug. 13, 2018, 26 pages.
KR 10-2011-7003491, "Office Action", dated Jun. 28, 2016, 3 pages.
KR 10-2011-7003491, "Office Action", dated Oct. 13, 2016, 4 pages.
KR 10-2011-7003511, "Office Action", dated Jul. 28, 2015, 5 pages.
KR 10-2014-7028879, "Office Action", dated Jan. 21, 2015, 9 pages.
KR 10-2016-7002451, "Office Action", dated Jan. 6, 2017, 3 pages.
KR 10-2016-7002451, "Office Action", dated May 19, 2016, 3 pages.
KR 10-2016-7002561, "Notice of Final Rejection", dated Dec. 12, 2016, 12 pages.
KR 10-2016-7002561, "Office Action", dated Feb. 9, 2017, 4 pages.
KR 10-2016-7002561, "Office Action", dated Apr. 29, 2016, 5 pages.
KR 10-2016-7026279, "Office Action", dated May 26, 2017, 3 pages.
KR 10-2016-7026279, "Office Action", dated Oct. 27, 2016, 3 pages.
KR 10-2016-7027748, "Office Action", dated Nov. 21, 2016, 4 pages.
KR 10-2016-7027748, "Office Action", dated Sep. 8, 2017, 9 pages.
KR 10-2017-7006891, "Office Action", dated May 22, 2017, 17 pages.
KR 10-2017-7006891, "Office Action", dated Feb. 6, 2018, 7 pages.
KR 10-2017-7006891, "Office Action", dated Dec. 15, 2017, 8 pages.
KR 10-2017-7032718, "Office Action", dated Dec. 29, 2017, 6 pages.
KR 10-2018-7006662, "Office Action", dated Apr. 24, 2018, 12 pages.
KR 10-2018-7013053, "Office Action", dated Jul. 20, 2018, 8 pages.
Poupyrev et al., "Ambient Touch: Designing Tactile Interfaces for Handheld Devices", Online Available at http://www.csl.sony.co.jp/IL, Oct. 27-30, 2002, 10 pages.
Sommerer et al., "Mobile Feelings: Wireless Communication of Heartbeat and Breath for Mobile Art", The 14th International Conference on Artificial Reality and Telexistence (ICAT 2004), Online Available at http://www.interface.ufg.ac.at/christa-laurent/WORKS/PDF/ICAT04SommererReference.pdf, Nov. 30, 2004, 6 pages.
CN201510019130.4, "Office Action", dated Dec. 5, 2018, 15 pages.
JP2018-000108, "Office Action", dated Oct. 30, 2018, 7 pages.
KR10-2018-7006662, "Office Action", dated Dec. 6, 2018, 7 pages.

\* cited by examiner

SYSTEMS AND METHODS FOR PHYSICS-BASED TACTILE MESSAGING

CROSS-REFERENCES TO RELATED APPLICATIONS

This utility patent application claims priority to: U.S. Provisional Patent Application No. 61/080,978, entitled "Systems and Methods for Physics-Based Tactile Messaging" filed Jul. 15, 2008; U.S. Provisional Patent Application No. 61/080,981, entitled "Systems and Methods for Mapping Message Contents to Virtual Physical Properties for Vibrotactile Messaging" filed Jul. 15, 2008; U.S. Provisional Patent Application No. 61/080,985, entitled "Systems and Methods for Shifting Sensor Haptic Feedback Function Between Passive and Active Modes" filed Jul. 15, 2008; U.S. Provisional Patent Application No. 61/080,987, entitled "Systems and Methods for Gesture Indication of Message Recipients" filed Jul. 15, 2008; U.S. Provisional Patent Application No. 61/148,312, entitled "Systems and Methods for Pseudo-Telepresence in a Shared Space" filed Jan. 29, 2009; and U.S. Provisional Patent Application No. 61/181,280, entitled "Systems and Methods for Transmitting Haptic Messages" filed May 26, 2009, the entirety of all of which are hereby incorporated by reference.

FIELD OF THE INVENTION

The present invention generally relates to messaging systems, and more particularly to systems and methods for physics-based tactile messaging.

BACKGROUND

Conventional messaging systems on messaging devices may rely on both or either of visual or auditory feedback to provide cues for determining the category and content of a message. For example, a smart phone may beep and/or flash upon receipt of a phone call, voice mail, or text message. Basic haptic feedback may also be used, but provides the user with little information about a message. For instance, a simple vibration might accompany the receipt of a phone call. Or, a sound effect such as a ring tone may be accompanied by a vibration. In messaging devices with touch screens and virtual keypads, simple haptic effects may be output to mimic a user's experience with the look and feel of a conventional keypad having multiple buttons.

Such standard visual, audio, and haptic feedback may fail to provide a compelling interaction for the user of the messaging device. Accordingly, there is a need for physics-based tactile messaging.

SUMMARY

Embodiments of the present invention provide systems and methods for physics-based tactile messaging. For example, in one embodiment, a method for physics-based tactile messaging comprises receiving a sensor signal from a sensor configured to sense a physical interaction with a messaging device, determining an interaction between one or more virtual message objects and a virtual message environment, the interaction based at least in part on the sensor signal and a virtual physical parameter of at least one of the one or more virtual message objects, determining a haptic effect based at least in part on the interaction, and generating a haptic signal configured to cause an actuator to output the haptic effect. In another embodiment, a computer-readable medium comprises program code for carrying out such a method.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
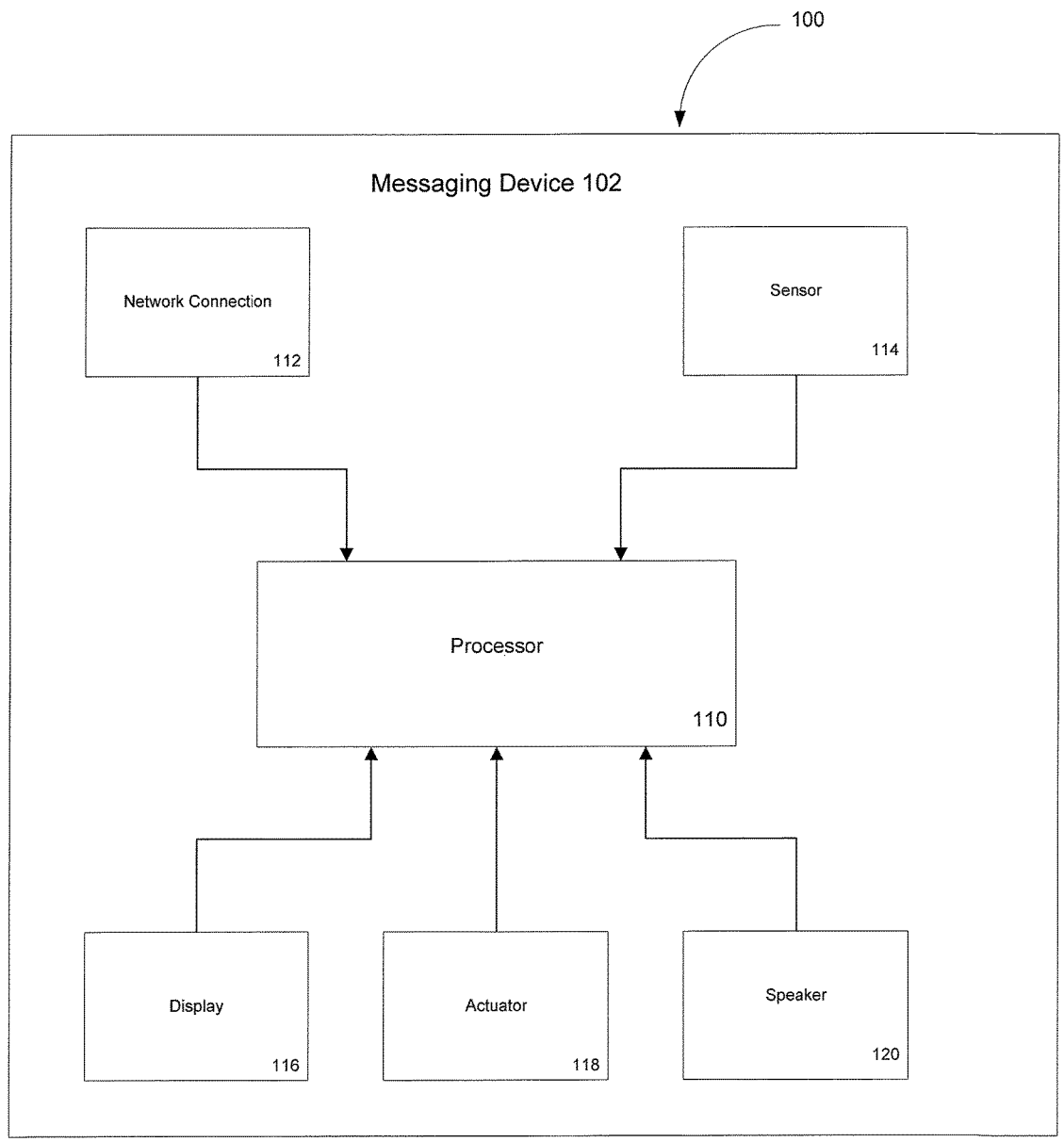
FIG. 1 is a block diagram of a system for physics-based tactile messaging according to one embodiment of the present invention.

Embodiments of the present invention provide systems and methods for physics-based tactile messaging.

Illustrative Embodiment of Physics-Based Tactile Messaging

In one embodiment of the present invention, a messaging device such as a mobile smart phone comprises a processor in communication with a display and an actuator configured to generate a haptic effect. In the embodiment, the messaging device comprises the Samsung SGH-i710 mobile smart phone equipped with Immersion Corporation's VibeTonz® vibrotactile feedback system. In another embodiment, the messaging device comprises Immersion Corporations TouchSense® Technology system also known as Immersion TouchSense® vibrotactile feedback system. Other messaging devices and haptic feedback systems may be utilized.

In the embodiment, the smart phone displays a multi-dimensional kinetic inbox, or a virtual message environment. The virtual message environment contains messages represented as virtual message objects. A virtual message object may take any form that the device is capable of displaying, for example a scroll, a capsule, or a ball. Each type of virtual message object may correspond to a specific type of message. For example, virtual message objects in the form of a tube or a cylindrical scroll may represent text messages or chat conversations. A short message intended to convey emotion, such as intimacy, may be represented as a virtual message object in the form of a heart.

By representing messages as virtual message objects, the properties and behavior of the virtual message objects may quickly and intuitively inform a user about their contents. The properties, or virtual physical parameters, of each virtual message object may comprise one or more of a size, a mass, a shape, a collision behavior, a texture, and/or a visual representation. One instance of a virtual message object may comprise an egg or a capsule containing a file. Such a virtual message object may have a large size parameter, a smooth texture parameter, and a fragile or brittle collision parameter. Another instance of a virtual message object conveying information with its physical properties is a beating heart. The heart virtual message object alone may be motionless, but when it contains a text message or other information, it is visually animated to make it look like it is beating. In addition, a haptic effect may be played that mimics the beating heart animation so that the heart virtual object feels like it is beating, indicating that it contains a message. The behavior or interactions of virtual message objects can be based, at least in part, on their virtual physical parameters.

According to the two-dimensional physical metaphor of an inbox, virtual message objects can be manipulated in a variety of ways. In the embodiment, the messaging device includes one or more sensors configured to sense a physical interaction with a messaging device, such as a touch screen, accelerometer or a gyroscope, configured to detect contact, pressure, acceleration, inclination, inertia, or location. After the sensor(s) is activated, a processor receives a sensor signal from the sensor. For example, an inertial sensor transmits a signal to the processor when the smart phone is jostled. By tilting or moving the smart phone, a virtual message object may interact with the virtual message environment according to the sensor signal and the virtual message object's virtual physical parameters. For example, tilting the device may cause a ball to move in the virtual message environment as if gravity were directly affecting it. The processor may determine this interaction between the virtual message object and the virtual message environment based, at least in part, on the sensor signal and a virtual physical parameter of the virtual message objects. For example, if the device is tilted while a ball resides in the virtual message environment, based on the angle of tilt as measured by the sensor, and the bouncy, non-eccentric, rolling virtual physical parameters of the ball, the processor may determine the speed at which the ball rolls, and that it will bounce against the boundaries of the virtual message environment.

After determining an interaction, the processor determines a haptic effect based at least in part on the interaction. In the embodiment, the processor determines a haptic effect simulating the ball bouncing against the environment, based on the ball's bouncy virtual physical parameter and the strength of the tilt measured by the gyroscope. In another example, a virtual message environment contains a plurality of virtual message objects in the form of balls. If the sensor signal indicates the user is vigorously shaking the device, the processor may determine that a large number of brief, high-frequency vibrations are appropriate to simulate the plurality of balls bouncing against each other and the walls of the virtual message environment.

Finally, the processor generates a haptic signal configured to cause an actuator to output the haptic effect. As the messaging device is tilted, shaken, or moved, the messaging device may vibrate or shake, simulating the effects of the device's movements on the virtual objects in the virtual messaging environment. The processor then transmits the haptic signal to the actuator, which may output the haptic effect.

Physics-Based Tactile Messaging

Embodiments of the invention presented herein provide systems and methods for physics-based tactile messaging. By incorporating a physical model into the virtual message environment, embodiments can leverage a user's everyday tactile experience and motor-sensory skills to intuitively navigate the user interface. Conventional messaging systems may provide little or no intuitive haptic feedback about the contents of messages. Text messaging systems using a conventional email metaphor, with a one-dimensional inbox showing subject lines, drafts, etc., may be visually and cognitively intensive, requiring a user's heightened attention for reading and authoring content. Physics-based tactile messaging, however, can facilitate non-linguistic communication of content through audio, visual, and haptic feedback which models a physical metaphor.

Illustrative Systems for Physics-Based Tactile Messaging

Referring now to the drawings in which like numerals indicate like elements throughout the several Figures, FIG. 1 is a block diagram of a system for physics-based tactile messaging according to one embodiment of the present invention. As shown in FIG. 1, the system 100 comprises a messaging device 102, such as a mobile phone, portable digital assistant (PDA), portable media player, or portable gaming device. The messaging device 102 comprises a processor 110. The processor 110 is in communication with a sensor 114, a network connection 112, a display 116, an actuator 118, and a speaker 120. The processor 110 is configured to generate a virtual message environment shown on display 116.

The processor 110 is in communication with the network connection 112. The network connection 112 may comprise one or more methods of mobile communication, such as infrared, radio, Wi-Fi or cellular network communication. In other variations, the network connection 112 comprises a wired network connection, such as Ethernet. The messaging device 102 can be configured to exchange messages or virtual message objects with other devices (not shown) over networks, such as a cellular phone network or the Internet. Embodiments of messages exchanged between devices may comprise voice messages, text messages, data messages, or other forms of messages.

The processor 110 can be configured to receive a new virtual message object signal comprising a new virtual message object via the network connection 112. For instance, the processor 110 may receive a new virtual message object signal from a remote device such as a different smart phone. In one variation, the processor 110 generates a new virtual message object. For example, an alarm or a reminder may cause a virtual message object to arrive in the virtual message environment. Upon receiving a new virtual message object, the processor 110 may be configured to determine an interaction between one or more virtual message objects and a virtual message environment, the interaction based at least in part on a virtual physical parameter of at least one of the one or more virtual message objects.

The processor 110 is also in communication with one or more sensors 114. The sensor 114 may comprise an accelerometer, a gyroscope, a GPS sensor, a touch-sensitive input device (e.g. touch screen, touch-pad), or some other type of sensor. The one or more sensors 114 may be configured to detect changes in, for example, acceleration, inclination, inertia, or location. For example, the messaging device 102 may comprise an accelerometer configured to measure acceleration of the messaging device 102. As another example, the messaging device 102 may comprise a location sensor, rotary velocity sensor, image sensor, pressure sensor, or other type of sensor. The one or more sensors 114 may be configured to send a sensor signal to the processor 110.

Users may interact with virtual message objects in the virtual message environment through movements or gestures which are detected by the one or more sensors 114. As the messaging device 102 is tilted, shaken, or otherwise moved, the one or more sensors 114 may detect these movements, and generate sensor signals to send to the processor 110, based at least in part on the movements. In one embodiment, an acceleration sensor is configured to detect the inclination and acceleration of the messaging device 102. As the messaging device 102 is tilted, the accelerometer can be configured to send signals to the processor based at least in part on the tilt and/or acceleration of the messaging device 102. Acceleration sensing may be used to simulate gravity in the virtual message environment. Upon receiving a sensor signal, the processor 110 may be configured to determine an interaction between one or more virtual message objects and a virtual message environment, the interaction based at least in part on the sensor signal and a virtual physical parameter of at least one of the one or more virtual message objects.

After determining an interaction, the processor 110 may be configured to determine a haptic effect based at least in part on the interaction. In one embodiment, a virtual message environment comprises a capsule or an egg. When a sensor 114 detects that the messaging device 102 is being tilted, the processor 110 may determine an interaction between the egg and the virtual message environment, such as the egg cracking against a wall of the virtual message environment. Based on this interaction, the processor 110 may determine a haptic effect, such as a simulated effect of the egg cracking against the virtual message environment boundary.

As shown in FIG. 1, the processor 110 is also in communication with a display 116. The processor can be configured to generate a graphical representation of a virtual message environment, to be shown on display 116. The virtual message environment shown on the display 116 may comprise a plurality of virtual message objects. The display 116 may comprise a touch-sensitive input device, such as a touch screen, configured to send and receive signals from the processor 110. Virtual message objects may be directly manipulated through a touch screen. For example, two-dimensional finger gestures on a touch screen display may select, touch, feel, drag, or throw a virtual message object within the virtual message environment.

The processor 110 is also in communication with one or more actuators 118. The actuator 118 may be configured to receive a signal from the processor 110, such as a haptic signal configured to cause the actuator 118 to output a haptic effect. The actuator 118 may be, for example, an electric motor, an electromagnetic actuator, a voice coil, a linear resonant actuator, a shape memory alloy, an electro-active polymer, a solenoid, an eccentric rotating mass motor (ERM) or a linear resonant actuator (LRA).

Finally, in the embodiment shown, the processor 110 is in communication with a speaker 120. The processor may be configured to determine a sound effect based at least in part on the interaction between a virtual message object and the virtual message environment, and then send an audio signal to the speaker based at least in part on the sound effect. The sound effect may simulate an interaction between a virtual message object and the virtual message environment, and/or an interaction between a first virtual message object and one or more other virtual message objects. The speaker can be configured to generate the sound effect based at least in part on the audio signal. The output of the haptic effect and the sound effect may be coordinated. In one embodiment, the speaker may generate the sound effect substantially simultaneously as the actuator generates the haptic effect.

Figure 2:
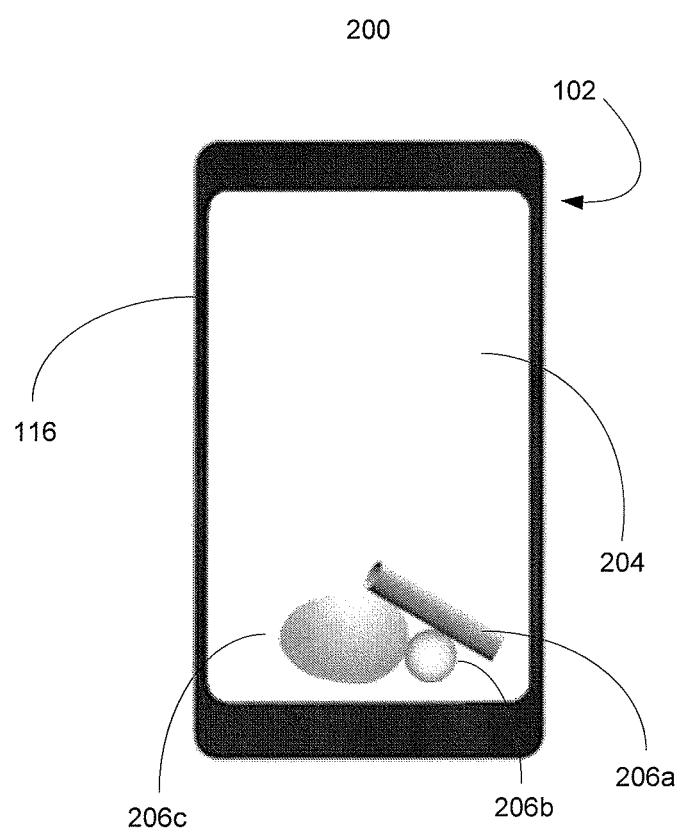
FIG. 2 is an illustration of a system for physics-based tactile messaging according to one embodiment of the present invention.

FIG. 2 is an illustration of a system for physics-based tactile messaging according to one embodiment of the present invention. The elements of the system 200 are described with reference to the system depicted in FIG. 1. A variety of other implementations are possible.

As shown in FIG. 2, the system 200 comprises a messaging device 102, such as a mobile phone, portable digital assistant (PDA), portable media player, or portable gaming device. The messaging device 102 can be configured to send and receive signals, such as voice mail, text messages, and other data messages, over a network such as a cellular phone network or the Internet. The messaging device 102 may include a wireless and/or a wired network connection 112. Although the device 102 is illustrated as a handheld messaging device in FIG. 2, other embodiments may use other devices, such as video game systems and/or personal computers to send and receive virtual message objects.

As shown in FIG. 2, the messaging device 102 comprises a display 116. In addition to the display 116, the messaging device 102 may comprise buttons, a touchpad, a scroll wheel, a rocker switch, a joystick, or other forms of input (not shown). The display 116 may comprise a touch-sensitive input device, such as a touch screen.

The display 116 is configured to receive signals from the processor 110 and generate a virtual message environment 204. The virtual message environment 204 may comprise a visual representation of a multi-dimensional inbox. Inside the virtual messaging environment 204, one or more messages may be represented as virtual message objects. Some examples of virtual message objects include arrows, balls, capsules, hearts, and tubes. As shown in FIG. 2, the virtual message environment 204 comprises three virtual message objects 206a, 206b, and 206c. Inside the virtual message environment 204, virtual message objects may freely move around, bouncing and colliding with the boundaries of the virtual message environment 204 and other virtual message objects inside the environment.

Each virtual message object 206 may represent a message and/or a file, such as a text message, a picture, a video, a voice mail, a reminder, or a pseudo-emotional message such as a smiley or a frown. A virtual message object in the form of a tube or rolled-up scroll 206a may represent a text message. A virtual message object in the form of an egg or a capsule 206c may represent a message with an attachment, such as a video file, a picture, or a song. In another embodiment, a virtual message object may take the form of an object which the sender wraps in virtual wrapping paper. In such an embodiment, the sender may have several different types of virtual wrapping paper, or may create their own unique virtual wrapping paper.

In another embodiment, a virtual message object may take the form of a user crafted stamp. The stamp may comprise animation and a haptic effect. For example, a virtual message object may take the form of a stamp, and the stamp may comprise an image of the sender. The stamp may further comprise an animation, for example an animation of the user reaching their hand up as if to give the recipient a high five. The stamp may further comprise an associated haptic effect. For example, in one embodiment a stamp comprising an animation of the sender giving a high five, may further comprise a haptic effect that approximates the impact of a high five. In some embodiments, a user may send the stamp alone, without any other message. In another embodiment, a user may include the stamp along with a virtual message object. In such an embodiment, the stamp may act as the sender's virtual signature.

Virtual message objects may also represent various forms of non-verbal communication, such as gestures, facial expressions, or emotions. For example, virtual message object 206b, shown as a ball, may correspond to a non-verbal message such as an indication of playfulness. A virtual message object shown as an arrow may represent a poke or a jabbing gesture (i.e. to request or demand attention). Other virtual message objects may represent a heart, a basketball, a water balloon, a typewriter, or some other form of visual representation. The type of data that a virtual message object represents may be included in the determination of the virtual message object's form. Some effective virtual message objects may have easily identifiable visual and/or haptic properties and/or effects, such as the clanging of keys of a typewriter. Such a virtual message object may represent a message from work, a text message, or a word processing file. In another embodiment, a virtual message object may represent the urgency of a message. For example, in such an embodiment, the virtual message object may take the shape of an explanation point or some other shape representative of urgency. Such a message object may further comprise a strong haptic effect representative of the message's urgency.

Each virtual message object may comprise one or more virtual physical parameters. Some virtual physical parameters, such as size, mass, shape, collision behavior, texture, or visual representation, may be static parameters, inherent properties of the virtual message object itself. Other virtual physical parameters, such as urgency, lifetime, and/or attitude, may be transitory or temporary parameters. Such variable virtual physical parameters may be associated with how the virtual message object is sent or received.

The virtual physical parameters of a virtual message object can be modeled visually and haptically, through the display 116 and the actuator(s) 118. The virtual physical parameters of the virtual message object may be based on inherent and/or transitory properties of the virtual message object. Inherent properties of a virtual message object may include the object's size, mass, shape, density, or texture. Transitory properties of a virtual message object, such as urgency, lifetime, and/or attitude, may be based on information associated with the transmission or exchange of the virtual message object.

Particular types or classes of messages may be represented as a single type of virtual message object. For example, all text messages may be represented as scrolls or rolled tubes, and as being light, thin, and elastic. Alternatively, messages with file attachments may be represented as eggs that are large, heavy, brittle, and oval-shaped. Individual virtual physical parameters may correspond with parameters of the message. For example, a large egg may represent a message with a file attachment containing a large amount of data, while a small egg may represent a message with a file attachment containing a small amount of data.

By representing messages as virtual message objects with physical parameters, clues regarding the type and contents of the objects may be deduced from their appearance or haptic behavior. Objects modeled with thin surfaces, such as an egg-shelled virtual message object, may crack or break upon impact with a boundary of the virtual message environment. Alternatively objects modeled with different surfaces or collision properties, such as a bouncy ball or a ping pong ball, may continually bounce off of the boundaries of the virtual message environment. By determining haptic effects based at least in part on one or more virtual physical parameters, users may associate specific haptic effects with specific types of messages. For example, when a haptic effect simulating an egg breaking is generated, a user may deduce that a message with an attachment has been received. As another example, when a haptic effect simulating a beating heart is generated, a user may deduce that a message expressing emotional intimacy has been received. Thus, haptic effects based at least in part on the virtual physical properties of a message may lead to an enhanced user experience.

The processor 110 may determine haptic effects based at least in part on interactions between one or more virtual message objects and the virtual message environment, the interactions based at least in part on the signals received from one or more sensors 114 and at least one virtual physical parameter of at least one of the one or more virtual message objects. In one embodiment, a virtual message object in the form of a tennis ball may have virtual physical properties such as a rough-textured surface and a hollow rubber core. When a user rubs the ball through a touch-sensitive input display 116, an actuator 118 may generate a haptic effect to simulate the tennis ball's rough surface. If a user pokes the ball, an actuator 118 may generate a haptic effect configured to simulate the tennis ball's hollow rubber core.

By modeling a multi-dimensional environment, virtual message objects may move around freely in the virtual message environment 204, and potentially interact with each other and the environment. For example, virtual message objects may roll around and collide with each other and the boundaries of the virtual message environment 204. In one embodiment, when the device 102 is tilted, a virtual message object 206b may roll from the top of the virtual message environment 204 to the bottom. While the virtual message object 206b is rolling, the actuator 118 may generate a vibration simulating the texture of the virtual message object 206b. If, and when, the virtual message object 206b bounces against the bottom of the virtual message environment 204, the actuator 118 may generate a haptic effect simulating the bounce or collision. Haptic effects based on such interactions may also be coordinated with sound effects generated by the speaker 120, and shown in the virtual message environment 204.

As the messaging device 102 receives new virtual message object signals associated with new virtual message objects, the virtual message objects may 'arrive' within the virtual message environment. These virtual message objects may then interact with the virtual message environment 204 and/or other virtual message objects. The processor 110 may determine haptic effects based at least in part on the arrival of the new virtual message object. For example, the messaging device 102 can receive a virtual message object signal associated with a virtual message object in the form of a ball. The virtual message environment 204 may show the ball arriving from the top of the environment, falling, and bouncing at the bottom of the environment before coming to a rest. The processor 110 may determine a haptic effect based on the ball's interaction with the virtual message environment.

In some embodiments, the processor 110 may determine a haptic effect associated with the user's interaction with a virtual message object. For example a virtual message object may take the form of a package which comprises unique wrapping paper. A recipient of such a message may have to unwrap the package from the virtual wrapping paper to access the virtual message object. As the recipient unwraps the virtual message object, processor 110 may transmit haptic signals to actuator 118, which approximate tearing wrapping paper.

Illustrative Methods for Physics-Based Tactile Messaging

Figure 3:
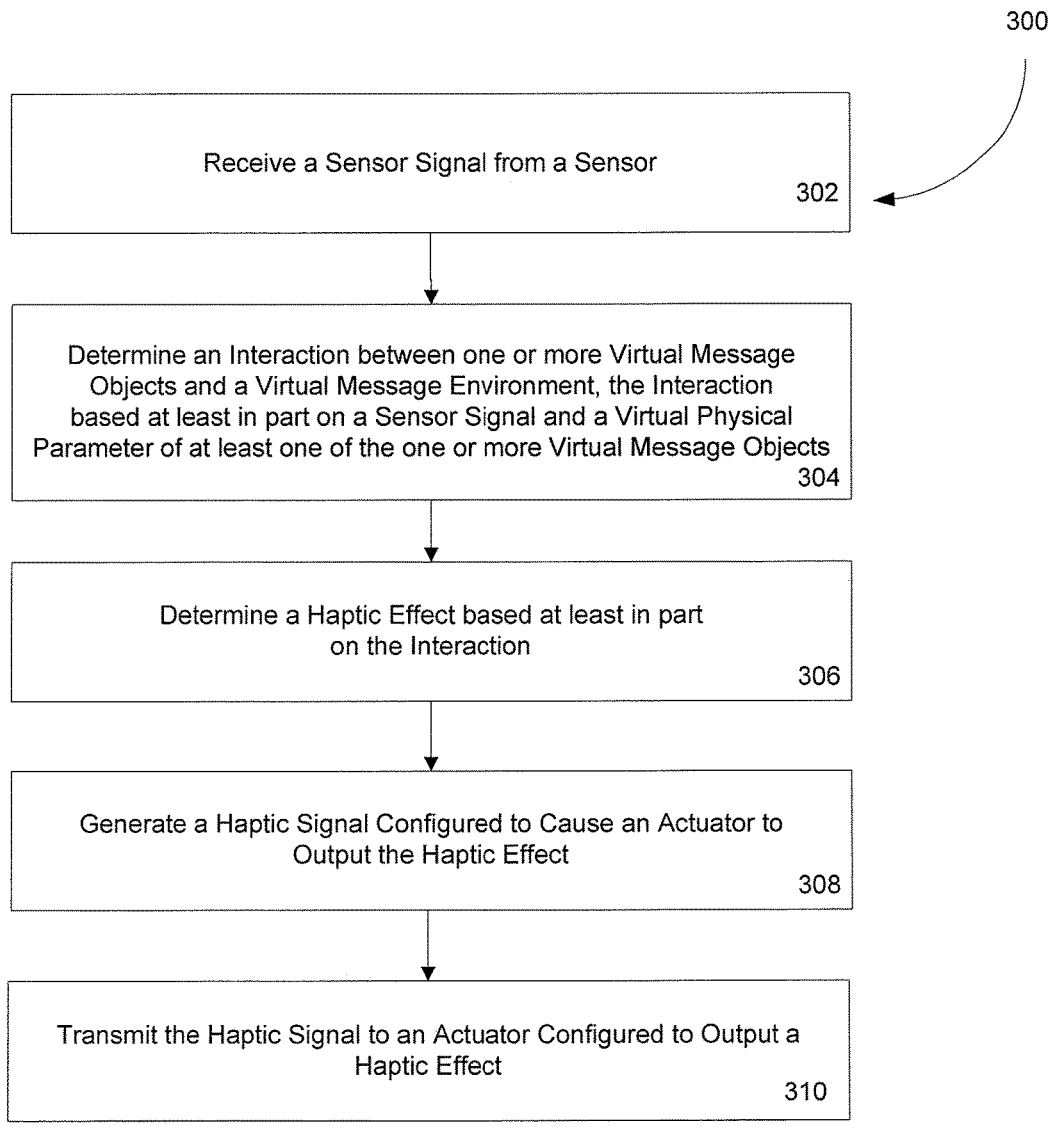
FIG. 3 is a flow diagram of a method for physics-based tactile messaging according to one embodiment of the present invention.

FIG. 3 is a flow diagram of a method for physics-based tactile messaging according to one embodiment of the present invention. In the method 300, a processor receives a sensor signal from a sensor 302. The sensor may comprise, for example, an accelerometer, a gyroscope, inclinometer, an optical sensor such as a camera, audio-spectrum sensors, ultrasonic transmitters and sensors, an infrared or other proximity sensor, a GPS sensor, or another sensor which can detect orientation or motion. The sensor may be configured to detect contact, pressure, acceleration, inclination, inertia, or location, or some other characteristic of the messaging device. A sensor signal may be generated when a messaging device is moved, rotated, or jostled. As one alternative, a sensor signal may be generated when a touch screen is engaged. By touching, moving, shaking, or rotating the messaging device, a user may interact with the virtual message objects within a virtual message environment.

Next, the processor determines an interaction between one or more virtual message objects and a virtual message environment, the interaction based at least in part on the sensor signal and a virtual physical parameter of at least one of the one or more virtual message objects 304. An interaction may comprise the modeled behavior of one virtual message object interacting with the virtual message environment and/or another virtual message object.

The virtual physical parameters of a virtual message object can inform the behavior of the virtual message object, or how the virtual message object interacts with the virtual message environment and other virtual message objects. For example, a virtual message object in the form of a small rubber ball may interact with other balls and/or the environment by bouncing against them. The same virtual message object may roll around the environment, much like a marble would roll around in a bin. In another example, a virtual message object in the form of a cylindrical scroll may slide around the virtual message environment, but not bounce when it collides with other objects or boundaries of the virtual message environment. A virtual message object in the form of an egg may crack or break upon a sudden impact with other objects or boundaries.

After determining an interaction, the processor determines a haptic effect based at least in part on the interaction 306. For example, a user may jostle the messaging device in an attempt to decipher the contents of the virtual message environment. If the virtual message environment contains a single virtual message object such as a large, brittle egg, the processor may determine a haptic effect simulating the egg breaking (e.g. a single large crack). As another example, if there are many virtual message objects comprising kinetic bouncy balls, the processor may determine that a large number of small, quick vibrations are appropriate to simulate the kinetic balls bouncing off of the environment and each other. By associating the haptic effects with the virtual physical parameters of the virtual message objects, a user may correlate certain haptic effects with certain types of objects. For example, when the actuator outputs a haptic effect simulating a beating heart, the user may immediately guess that she has received an intimate message or virtual message object without looking at the messaging device.

Finally, the processor generates a haptic signal configured to cause an actuator to output the haptic effect 308. The processor is configured to transmit the haptic signal to one or more actuators configured to output the haptic effect 310. In one variation, the processor determines a haptic effect simulating an arrow hitting a wall, such as a thud, and generates a haptic signal configured to cause an actuator to output the thud. The haptic signal may be transmitted to the actuator, which outputs the haptic effect.

Figure 4:
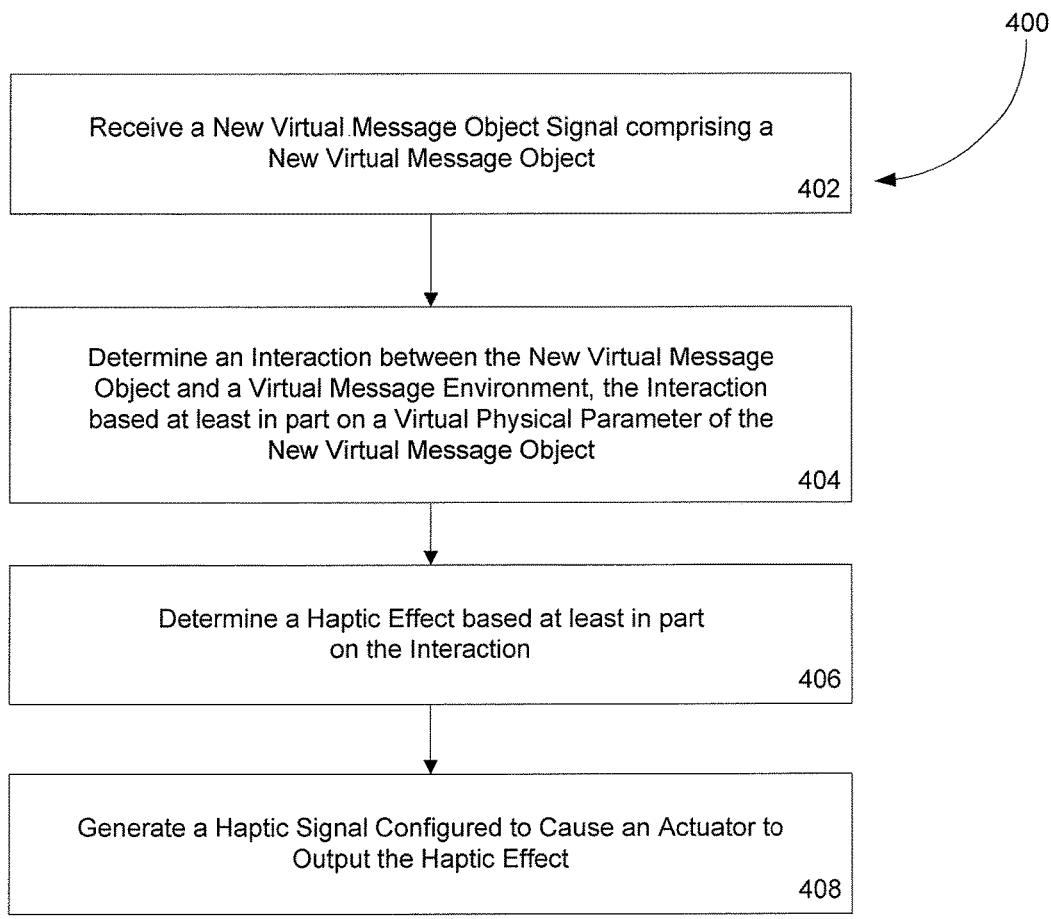
FIG. 4 is a flow diagram of a method for physics-based tactile messaging according to one embodiment of the present invention.

FIG. 4 is a flow diagram of a method for physics-based tactile messaging according to one embodiment of the present invention. In the method 400, a processor receives a new virtual message object signal comprising a new virtual message object 402. When a virtual message object is sent from one device to another, a new virtual message object signal may be received by the recipient's messaging device. The new virtual message object signal may be associated with a new virtual message object. In one embodiment, the new virtual message object signal is generated by an alarm or a reminder. For example, an alarm may be represented by a virtual message object in the form of an arrow or a water balloon. When it is time for the alarm to trigger or activate, a new virtual message object representing the alarm may be generated in a virtual message environment.

Next, the processor determines an interaction between the new virtual message object and a virtual message environment, the interaction based at least in part on a virtual physical parameter of the new virtual message object 404. When a new virtual message object is received, it may interact with the virtual message environment based at least in part on how it was sent. In one example, a sender may send a virtual message object from her inbox using a quick gesture. The quick gesture may be translated into a virtual physical parameter associated with the virtual message object. When the virtual message object is received, the virtual message object may arrive in the virtual message environment and behave or interact with other objects and/or the environment based at least in part on the virtual physical parameter associated with the speed of the sending gesture.

The processor then determines a haptic effect based at least in part on the interaction 406. In one example, an empty virtual message environment receives a virtual message object in the form of an urgently sent, large, brittle egg. After determining the egg will collide and break against a boundary of the virtual message environment, the processor determines a haptic effect simulating the egg breaking. As another example, a virtual message environment filled with various virtual message objects receives a new virtual message object in the form of a slowly sent kinetic bouncy ball. After determining the behavior or interaction of the new ball in the environment, such as a gentle bounce before coming to rest, the processor determines a haptic effect simulating the gentle bounce.

Finally, the processor generates a haptic signal configured to cause an actuator to output the haptic effect 408. In one variation, when a new text message is received on a messaging device, the processor generates a haptic signal to simulate the effects of the new text message colliding with the virtual message environment.

Illustrative Scenarios for Physics-Based Tactile Messaging

In one embodiment of physics-based tactile messaging, a user interface environment of a messaging device incorporates a physical model. The user interface environment may represent a two-dimensional kinetic inbox, such as a flat marble bin, or a billiard table. Virtual message objects move and interact within the two dimensions of the virtual message environment, such as billiard balls moving and colliding on a billiard table, but always remaining on its surface. When the messaging device is moved relative to a virtual message object, the real force of gravity, as sensed by an accelerometer, may appear to act on the virtual message object, creating the illusion of the virtual message object being independent of the messaging device. Haptic effects, such as a simulation of frictional vibrations as a virtual message object rolls, or a simulation of a pulse when the virtual message object collides with the boundaries of the virtual message environment, may create the illusion of a physical object inside the message environment, rather than just a piece of data inside an inbox.

Figure 5C:
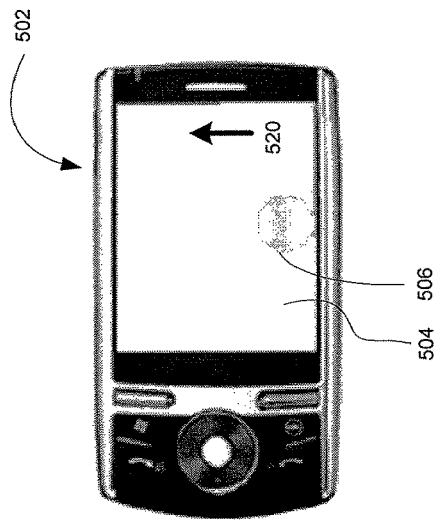
FIGS. 5A, 5B, and 5C are illustrations of physics-based tactile messaging according to one embodiment of the present invention.
Figure 5B:
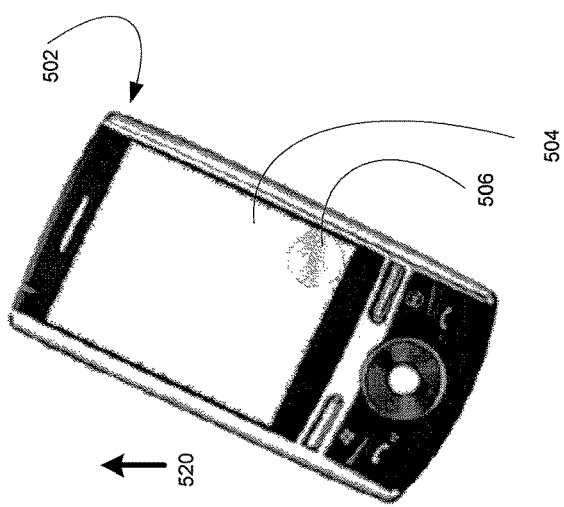
Figure 5A:
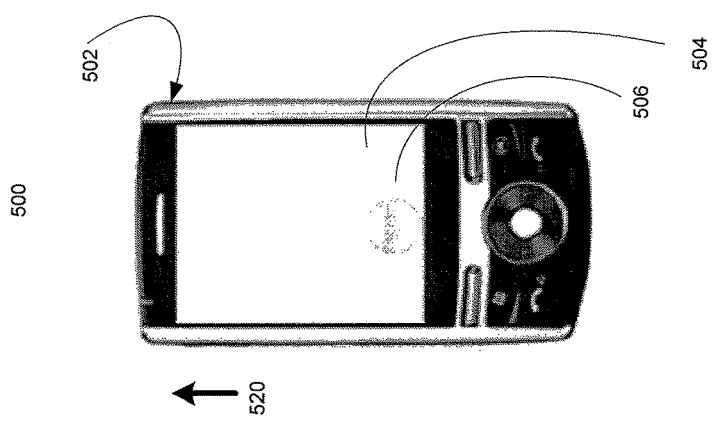

FIGS. 5A, 5B, and 5C are illustrations of physics-based tactile messaging according to one embodiment of the present invention 500. As shown in FIGS. 5A, 5B, and 5C, the system comprises a messaging device 502. The messaging device 502 is configured to generate a virtual message environment 504. As shown in FIGS. 5A, 5B, and 5C, the virtual message environment 504 comprises a virtual message object 506 in the form of a ball. In other variations, the virtual message environment 504 may comprise a plurality of similar or different virtual message objects 506.

In FIG. 5A, the messaging device 502 and the virtual message environment 504 are shown in a vertical orientation, as indicated by the direction of the arrow 520. The graphical position of the contents of the virtual message environment 504 may correspond to the orientation of the messaging device. As shown in FIG. 5A, the messaging device is shown in the vertical direction, and the contents of the virtual message environment are shown resting at the bottom of the virtual message environment 504, which corresponds to the bottom of the device 502.

In FIG. 5B, the messaging device 502 is rotated clockwise, or to the right. As the messaging device 502 is moved, or rotated, a sensor may send signals to a processor based at least in part on the movement of the messaging device 502. In one variation a sensor, such as an accelerometer, sends signals to a processor reporting changes in acceleration. In another variation a sensor, such as a gyroscopic sensor, sends signals to a processor reporting the rotational velocity of the device.

An interaction, such as a movement or a collision of the virtual message object in the virtual message environment, may be based at least in part on a sensor signal. In FIG. 5B, the virtual message object 506 has rolled or moved to the lower right corner of the virtual message environment 504. In the illustration, the virtual message object 506 has moved within the virtual message environment in response to the rotation of the messaging device 502, as if gravity were acting on the object 506, and pulling the object 506 towards the bottom of the virtual message environment 504. An interaction may also be based at least in part on a virtual physical parameter of the virtual message object 506. As shown in FIG. 5B, the virtual message object 506 is a round ball. When the messaging device is tilted or rotated at various angles, the round ball 506 may simultaneously roll within the virtual message environment 506. A virtual message object in the shape of an egg may wobble, rather than roll, and a virtual message object such as a tube may slide around the virtual message environment.

As the virtual message object 506 moves or rolls within the virtual message environment, the processor may determine a haptic effect based at least in part on the interaction of the virtual message object and the virtual message environment. For example, while the virtual message object 506 is rolling and moving within the virtual message environment 504, the processor may determine a haptic effect simulating the texture of the virtual message object 506. Depending on the virtual physical parameters of the virtual message object 506 and a user's movement of the messaging device 502, the virtual message object 506 may bounce, roll, or shatter within the virtual message environment 504 in response to movements of the messaging device 502. In one scenario, a user may vigorously shake the messaging device 502. In response, a virtual message object 506 modeling a bouncy ball may bounce and ricochet within the virtual message environment 504. At the same time, haptic effects resembling a bouncing ball may coincide with the movement of the virtual message object 506 within the environment 504.

In FIG. 5C, the messaging device 502 is shown rotated ninety degrees clockwise. The virtual message object 506 has rolled from the lower right corner of the environment 504 to the middle of the bottom of the virtual message environment 504. Having reached the bottom of the virtual message environment 504, the ball 506 may roll from side to side based at least in part on slight movements of the device to the right or left.

Figure 6A:
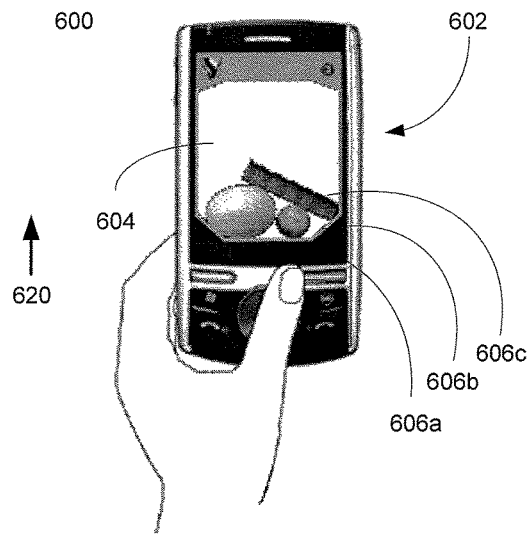
FIGS. 6A, 6B, and 6C are illustrations of physics-based tactile messaging according to one embodiment of the present invention.
Figure 6B:
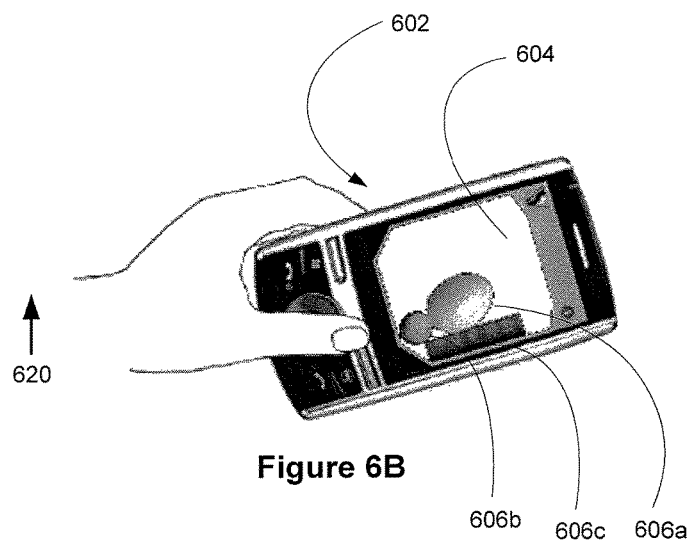
Figure 6C:
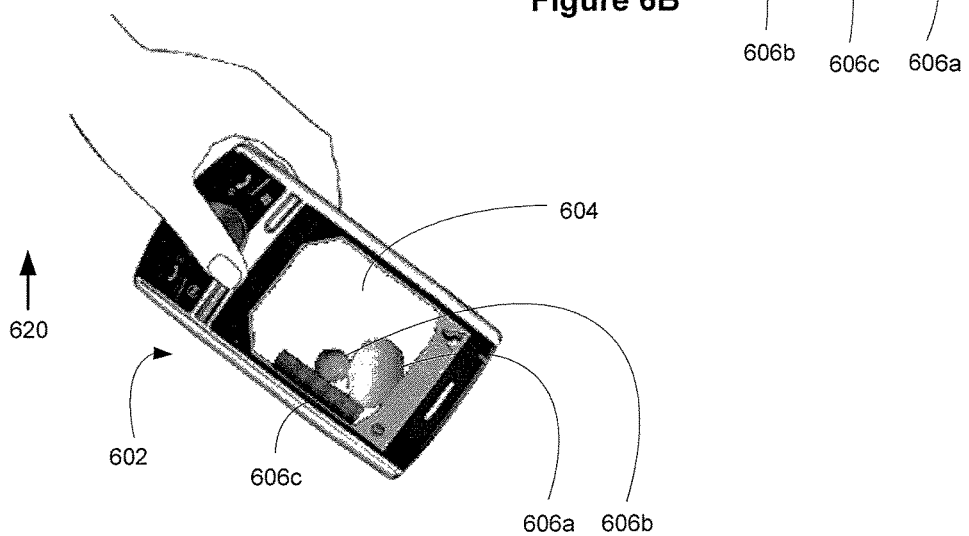

FIGS. 6A, 6B, and 6C are illustrations of physics-based tactile messaging according to one embodiment of the present invention 600. FIGS. 6A, 6B, and 6C illustrate the movement of three virtual message objects in a virtual message environment displayed on a messaging device, as the device is rotated in a clockwise direction. Moving or shaking the messaging device may cause the virtual message objects to jostle and/or be repositioned, which may generate a haptic effect indicative of how many virtual message objects are in a virtual message environment, their type, and/or their content.

As shown in FIGS. 6A, 6B, and 6C, a messaging device 602 generates a virtual message environment 604. The virtual message environment 604 contains three virtual message objects, 606a, 606b, and 606c. The interactions, or behavior, between each of the virtual message objects 606a, 606b, 606c and the virtual message environment 604 may be based at least in part on their individual virtual physical parameters. The virtual message object 606c, a tube, may be unlikely to break in a collision and prone to sliding rather than rolling. The virtual message object 606a, an egg, may wobble instead of rolling, and be more likely to break or crack in a collision. Virtual object 606b, a ball, may be a virtually unbreakable, and likely to roll and bounce.

In FIG. 6A, the messaging device 602 is shown held by a user in a vertical orientation as indicated by the direction of arrow 620. The three virtual message objects 606a, 606b, and 606c rest at the bottom of the virtual message environment, in no particular order. By utilizing methods for physics-based tactile messaging, the three virtual message objects 606*a*, 606*b*, and 606*c* may react to movements of the device 602 in an intuitive manner. In FIGS. 6A, 6B, and 6C, the messaging device 602 is rotated, and the three virtual message objects 606*a*, 606*b*, and 606*c* are shown realistically moving in the virtual message environment, as if each virtual object was a real physical object inside the messaging device reacting to physical forces such as gravity.

In FIG. 6B, the device is shown being rotated to the right, in a clockwise direction. In response to the rotational gesture, the virtual message objects 606*a*, 606*b*, and 606*c* are shown to have shifted to the lower corner of the virtual message environment, which now corresponds to the bottom of the virtual message environment. The movement of each of the virtual message objects 606*a*, 606*b*, and 606*c* may model the effect gravity might have on objects if they were actually inside the device. During the movement of the virtual message objects, the messaging device 602 may generate one or more haptic effects corresponding to the objects' shift in the virtual message environment. As the virtual message objects shift on the display, haptic effects simulate their movement against each other and within the virtual message environment. As one example, the virtual message tube 606C may have fallen over onto its side as the device 602 was rotated to the right. An actuator may generate a short, hard force or vibration, intended to mimic the thud of the tube hitting the side of the virtual message environment 604.

Finally, in FIG. 6C, the messaging device is shown rotated nearly 180 degrees, or turned upside-down. The virtual message objects 606*a*, 606*b*, and 606*c* now rest in the lower right corner of the device, corresponding to the lowest point in the virtual message environment. Haptic effects corresponding to the interactions between the virtual message objects and the virtual message environment may be output by one or more actuators in the messaging device.

Figure 7:
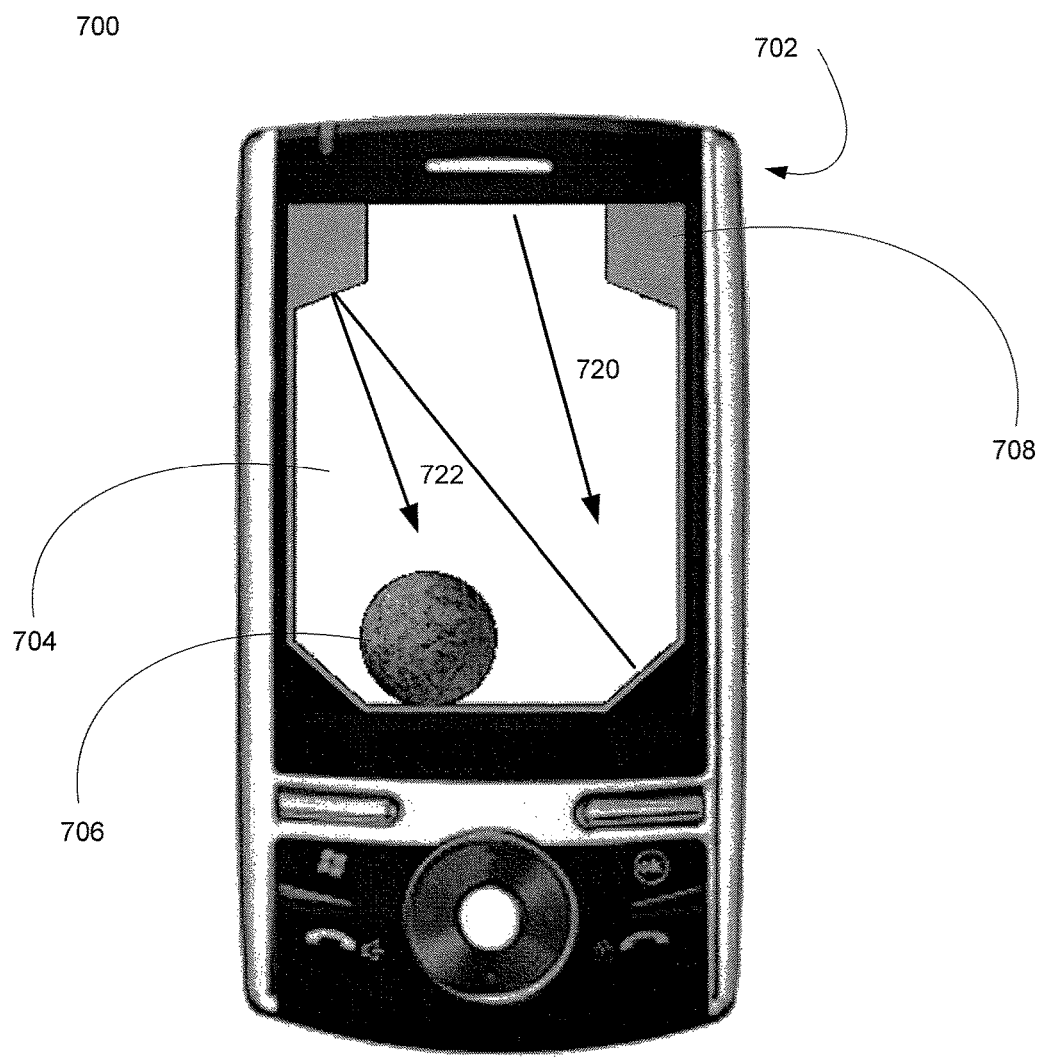
FIG. 7 is an illustration of physics-based tactile messaging according to one embodiment of the present invention.

FIG. 7 is an illustration of physics-based tactile messaging according to one embodiment of the present invention. In FIG. 7, the system 700 comprises a messaging device 702, which is displaying a virtual message environment 704. A single virtual message object 706 is located at the bottom of the virtual message environment 704. In some embodiments, a separate messaging device (not shown) sends the virtual message object to the messaging device 702. In other embodiments, the messaging device 702 itself may generate the virtual message object 706. Such internally generated virtual message objects may comprise alarms, alerts, or reminders.

As shown in FIG. 7, the new virtual message object 706 arrived in the virtual message environment by falling from the top of the message gateway 708 towards the bottom of the virtual message environment 704 in the direction of the arrow 720. Upon receiving a new virtual message object signal, the processor of the messaging device 702 may determine an interaction between the new virtual message object 706 and the virtual message environment 704, the interaction based at least in part on a virtual physical parameter of the new virtual message object 706. As shown in FIG. 7, a virtual physical parameter corresponding to a slight right direction or trajectory may have lead the new virtual message object to fall in the direction of arrow 720. Such arrival behavior may be based at least in part on transitory virtual physical parameters set by a sending device. In one embodiment, a device sending the virtual message object 706 may have initialized virtual physical parameters corresponding to the virtual message object's speed and trajectory, based at least in part on how a user sent the virtual message object 706 from the sending device. For example, when a user sends a virtual message object using a quick, off-center gesture, these transitory properties may be associated with the virtual message object. Thus, when the virtual message object 706 is received, the virtual message object's initial quick speed and off-center trajectory, as illustrated by arrow 720, may be determined based at least in part on the virtual physical parameters of the virtual message object 706.

The speed and trajectory of the virtual message object 706 may result in it bouncing or shattering against the walls of the virtual message environment, or against other virtual message objects inside the virtual message environment. In FIG. 7, the virtual message environment is empty, and the speed and trajectory of the new virtual message ball result in the ball bouncing off the lower wall of the virtual message environment 704, and subsequently bouncing again off the top wall of the virtual message environment 704. As the virtual message environment 704 illustrates the ball 706 bouncing against its walls in the direction indicated by arrow 722, the messaging device 702 may generate haptic effects corresponding to the interaction between the new virtual message object 706 and the virtual message environment 704

By determining haptic effects based on interactions between one or more virtual message objects and the virtual message environment and its contents, the haptic effects may provide non-visual information, or haptic cues, about the contents of the virtual message environment. A haptic effect simulating a ball repeatedly bouncing against the walls of the virtual message environment may lead a user to think that their inbox, or virtual message environment, is relatively empty. Conversely, a haptic effect simulating multiple collisions of multiple virtual message objects with each other may indicate that the virtual message environment is relatively full. In one embodiment, the haptic effects simulating the behavior of individual virtual message objects may provide haptic, non-visual clues to the contents of a message. Haptic effects simulating a beating heart or a bouncing ball may indicate that a playful message has been received. A haptic effect simulating an egg cracking may indicate that a message with a file attachment has been received.

Messages represented as virtual message objects may implement a token metaphor. In a token metaphor, tokens may retain their physical and visual properties as they are sent and received, or traded and exchanged between different entities. According to such a token metaphor, virtual message objects may retain their physical and visual properties as they are exchanged, or sent and received, between different messaging devices.

Figure 8A:
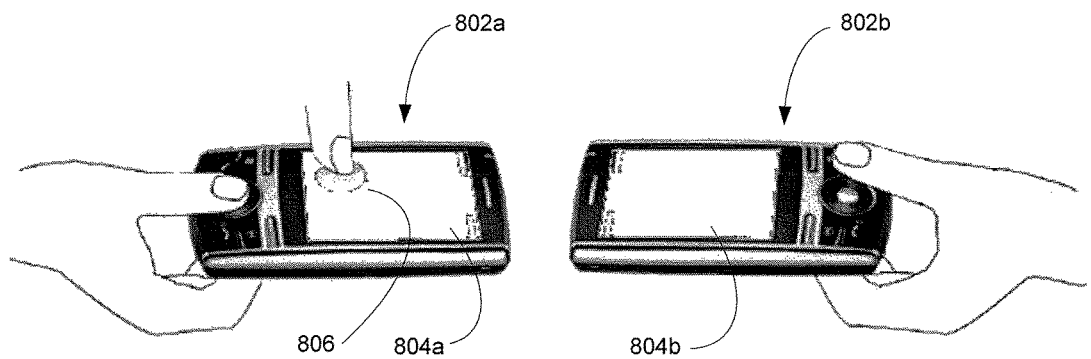
FIGS. 8A, 8B, and 8C are illustrations of physics-based tactile messaging according to one embodiment of the present invention.
Figure 8B:
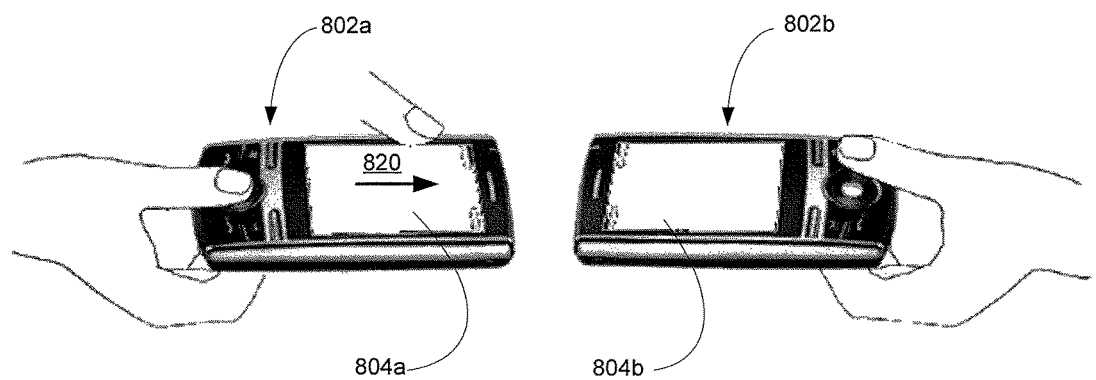
Figure 8C:
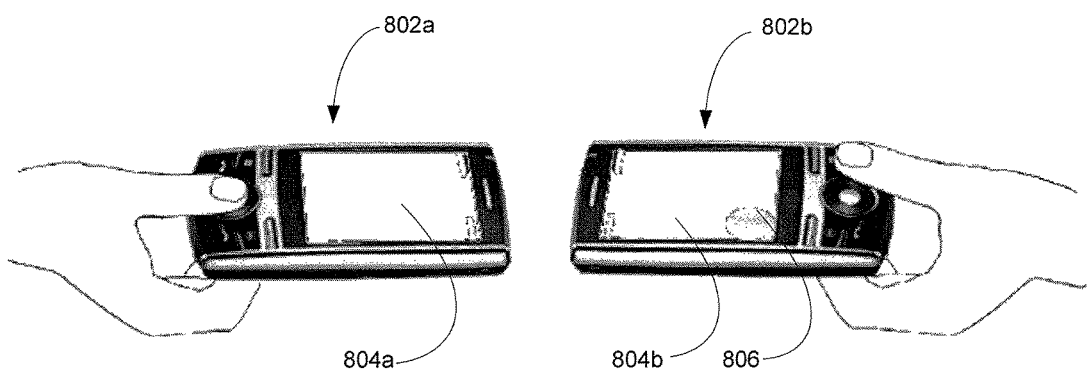

FIGS. 8A, 8B, and 8C are illustrations of physics-based tactile messaging according to one embodiment of the present invention. FIG. 8A illustrates two messaging devices 802*a* and 802*b* in communication with each other. The first messaging device 802*a* is displaying a virtual message environment 404*a*, and the second messaging device 802*b* is displaying a virtual message environment 804*b*. As shown in FIGS. 8A, 8B, and 8C, the first messaging device 802*a* is in communication with the second messaging device 802*b*. The messaging devices 802*a* and 802*b* may communicate over a cellular telephone network, a Wi-Fi data network, infrared, or through other networking means. Although the messaging devices 802*a* and 802*b* are shown in close proximity in FIGS. 8A, 8B, and 8C, the messaging devices 802*a* and 802*b* may communicate over any distance spanned by their connecting networks.

As shown in FIG. 8A, the virtual message environment 804a of the first messaging device 802a contains a single virtual message object 806. The virtual message environment 804b of the second messaging device 802b is empty. As illustrated in FIG. 8A, a user is engaging the virtual message object 806 in the first virtual message environment 804a by directly contacting the virtual message object through the touch screen. By contacting the virtual message object 806 and holding down a button, the user may indicate that she intends to move the virtual message object 806 rather than feel it.

In FIG. 8B, the user moved her finger in the direction shown by arrow 820, towards the virtual message environment gateway at the top or front of the virtual message environment. Such a gesture may indicate that the user intends to send the virtual message object 806. In one variation, a user may engage the virtual message object 806 through the touch screen and flick, push, or pull the virtual message object through the virtual message environment gateway. In another variation, a user may tilt the messaging device, causing the virtual object to fall through the gateway. As shown in FIG. 8B, the first messaging device 802a has sent the virtual message object 806 to the second messaging device 802b, and the virtual message object no longer resides in the first virtual message environment 804a.

The virtual message object 806 is transmitted from the first messaging device to the second messaging device over a network, such as a cellular telephone network. The virtual message object may be transmitted over other voice and/or data networks, such as a Local Area Network (LAN), Wide Area Network (WAN), or other suitable networks.

When the virtual message object 806 is sent, the sending messaging device 802a may associate certain properties with the departing virtual message object 806. In one embodiment, the kinetic energy associated with how a virtual message object is sent is preserved when the virtual message arrives at the remote device. For example, the speed or urgency of the message's departure may be associated as one virtual physical parameter of the virtual message object 806. If a user casually flicks or drops a virtual message object 806 through the gateway, the slow or subtle departure speed may be associated with the virtual message object 806. If a user urgently sends a virtual message object 806 through the gateway, such as with a quick flick, a fast departure speed parameter may be associated with the virtual message object 806. By preserving an urgency property of a virtual message object, virtual message objects may provide additional information to recipients about the contents of a virtual message object.

In FIG. 8C, the second messaging device 802b has received the virtual message object 806 sent from the first messaging device 802a, and the virtual message object 806 is shown in the lower corner of the second virtual message environment 804b. A processor and/or a network interface of the second messaging device 802b may be configured to receive new virtual message object signals. Unlike a conventional messaging system, where sent copies of messages reside in the outbox of a sending device, the virtual message environment 804a of the first messaging device 802a is shown empty after it has sent the virtual message object 806. In the embodiment shown in FIG. 8C, the virtual message object 806, illustrated as a ball, arrives at the second messaging device 802b by bouncing off of the internal boundaries of the virtual message environment 804b, recreating a physical model of a ball being tossed from one user and landing in another user's shared space or play area.

The new virtual message object signal may include information related to the internal physical properties and/or state of the virtual object 806 at the point where it exited through the gateway on the sender's device. Upon receiving a new virtual message object 806, the processor of the second messaging device 802b may determine an interaction between the new virtual message object 806 and the virtual message environment 804b, the interaction based at least in part on a virtual physical parameter of the newly received virtual message object 806. As an example, the processor of the first messaging device 802a may determine how fast the virtual message object was sent (i.e. transmission or departure velocity), and associate this speed property with the virtual message object 806. When the virtual message object 806 is received by the second messaging device 802b, the second messaging device 802b may use the transmission velocity to determine and model the initial behavior of the virtual message object 806 inside the virtual message environment 804b. A virtual message object 806b urgently sent from the first virtual message environment 804a may arrive by intensely bouncing around the second virtual message environment 804b. A virtual message object 806b subtly or softly sent from the first virtual message environment 804a may arrive by softly falling into the second virtual message environment 804b.

The processor of the messaging device 802b can determine a haptic effect based at least in part on the interaction between the newly received virtual message object 806 and the virtual message environment 804b. In FIG. 8C, the virtual message object 806 may have a transmission velocity virtual physical parameter associated with the speed of the message's departure from the first messaging device. A haptic effect may be determined based in part on this transmission velocity. In addition, a haptic effect may be based on other virtual physical parameters or features of the virtual message object, such as the object's size, mass, shape, collision behavior, texture, or visual representation.

Although the virtual message object 806 is represented as a ball, virtual message objects can be represented in other forms, with various parameters. In one embodiment, a virtual message object represented as a water balloon is sent from a first messaging device to a second messaging device. As a user sends the water balloon through the virtual gateway, the departure speed of the water balloon is associated with the object. After transmission over a network, the water balloon arrives at the second messaging device. Upon arrival, the second messaging device determines an interaction between the water balloon and the virtual message environment of the second messaging device. The interaction between the water balloon and the virtual message environment is based at least in part on a virtual physical parameter of the water balloon, such as its mass and/or velocity. In the embodiment, the receiving environment is empty, and upon arrival, the water balloon zooms through the gateway of the second virtual message environment, and hits a wall of the receiving environment, indicated to the user by a haptic effect simulating a splatter or splash, corresponding to the virtual message object visually splattering against the wall of the virtual message environment and a splash sound effect.

Embodiments of systems and methods for physics-based tactile messaging may provide various advantages over current messaging systems. Systems and methods for physics-based tactile messaging may leverage a user's normal tactile experiences and sensorimotor skills for navigating a user interface. By leveraging a user's normal experiences and physical intuition, systems and methods for physics-based tactile messaging may reduce a user's learning curve for a new user interface, increase the user interface's adoption rate, and increase user satisfaction.

Embodiments of physics-based tactile messaging may utilize a token metaphor for exchanging messages. In one aspect, tokens are passed or exchanged back and forth, while retaining at least some of their physical characteristics. Using a token metaphor, virtual message objects are sent back and forth, or exchanged, and may retain at least some of their virtual physical parameters, such as their physical and visual properties.

By representing messages as virtual message objects, specific virtual physical parameters of virtual message objects may convey information about the type and/or content of messages they represent. In one embodiment, a message type and/or shape corresponds to its virtual message object. A text message may be represented as an eccentric text tube or scroll. A message with a file attachment may be represented as a virtual message object in the form of a somewhat eccentric egg or capsule. A message representing a non-verbal communication of playfulness may be represented as a non-eccentric ball. In another embodiment, the size of a message corresponds to the size or mass of the virtual message object. A message with a large file attachment can be represented as a large or massive egg. A message such as a short text message or a message with a small file attachment can be represented as a small virtual message object.

The collision behavior, which may determine how a virtual message object interacts with other objects and/or the environment, may be based at least in part on these virtual physical parameters. For example, a heavy or more massive virtual message object may have large but infrequent collisions, whereas a smaller, less massive object may have small but frequent collisions. Haptic effects may be modeled on interactions between the virtual message environment and virtual message objects. Thus, haptic effects generated with physics-based tactile messaging may yield information about the content of an inbox and/or individual messages.

When tokens are sent back and forth, some of their expressive intent, such as how the token is exchanged, may be preserved. Thus, under a token metaphor, virtual message objects may retain properties associated with how they were sent or exchanged. These transitory parameters may be used by a receiving device to model the virtual message object's behavior in the receiving virtual message environment. As one example, when a virtual message object is sent from a sending device, the sending device associates the transmission speed with the virtual message object. Upon receipt of the virtual message object, the receiving device may model the collision behavior of the new virtual message object based at least in part on its transmission speed.

Messages or virtual message objects may be manipulated through various gestures performed on the messaging device. Sensors such as accelerometers and/or touch screens may detect these gestures, and translate the gestures into virtual forces acting on the virtual objects. For example, acceleration sensing may be used to simulate gravity in a virtual physical environment. When the messaging device is rotated, accelerometer data can be used to simulate the virtual message environment being rotated, like a marble bin being rotated on its side. Such movement can cause the virtual objects to move, roll, and/or collide, which can be graphically displayed within the user interface environment, and substantially simultaneously cause an actuator to generate corresponding haptic feedback. Through haptic effects, the virtual mass of a virtual message object may be haptically perceived, conveying non-visual information about what the virtual message object represents. Thus, merely moving the messaging device with a quick shake or nudge may convey information about the contents of virtual message environment in an intuitive, predictable fashion.

Embodiments of the present invention can be implemented in digital electronic circuitry, or in computer hardware, firmware, software, or in combinations of them. In one embodiment, a computer may comprise a processor or processors. The processor comprises a computer-readable medium, such as a random access memory (RAM) coupled to the processor. The processor executes computer-executable program instructions stored in memory, such as executing one or more computer programs for messaging. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise or be in communication with, media, for example computer-readable media, that may store instructions that, when executed by the processor, can cause the processor to perform the steps described herein as carried out or assisted by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor and the processing described may be in one or more structures, and may be dispersed through one or more structures. The processor may comprise code for carrying out one or more of the methods (or parts of methods) described herein.

General

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of this invention.

That which is claimed is:

1. A method comprising:
receiving a sensor signal from a sensor configured to sense a physical interaction with a messaging device;
determining an interaction between one or more virtual message objects and a virtual message environment, wherein the interaction between the one or more virtual message objects and the virtual message environment comprises a collision, the interaction based at least in part on the sensor signal and a virtual physical parameter of at least one of the one or more virtual message objects, the one or more virtual message objects each comprising a message and an associated data file, and wherein the virtual physical parameter is associated with the data file;

determining a haptic effect based at least in part on the interaction; and generating a haptic signal configured to cause an actuator to output the haptic effect.

2. A system, comprising:

a processor, configured to:

receive a sensor signal from a sensor configured to sense a physical interaction with a messaging device;

determine an interaction between one or more virtual message objects and a virtual message environment, wherein the interaction between the one or more virtual message objects and the virtual message environment comprises a collision, the interaction based at least in part on the sensor signal and a virtual physical parameter of at least one of the one or more virtual message objects, the one or more virtual message objects each comprising a message and an associated data file, and wherein the virtual physical parameter is associated with the data file;

determine a haptic effect based at least in part on the interaction; and generate a haptic signal configured to cause an actuator to output the haptic effect.

\* \* \* \* \*